US008867786B2

(12) United States Patent
Craig

(10) Patent No.: US 8,867,786 B2
(45) Date of Patent: Oct. 21, 2014

(54) SCENARIO-SPECIFIC BODY-PART TRACKING

(71) Applicant: Microsoft Corporation, Redmond, WA (US)

(72) Inventor: Robert Matthew Craig, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 176 days.

(21) Appl. No.: 13/665,627

(22) Filed: Oct. 31, 2012

(65) Prior Publication Data
US 2014/0119640 A1 May 1, 2014

(51) Int. Cl.
G06K 9/00 (2006.01)
G06K 9/62 (2006.01)

(52) U.S. Cl.
USPC .......................... 382/103; 382/154; 382/159

(58) Field of Classification Search
USPC ........................................ 382/154, 159, 103
See application file for complete search history.

(56) References Cited

U.S. PATENT DOCUMENTS

| 6,072,494 | A  | * | 6/2000 | Nguyen | ................. | 715/863 |
| 6,256,033 | B1 | * | 7/2001 | Nguyen | ................. | 715/863 |
| 7,039,239 | B2 |   | 5/2006 | Loui et al. | | |
| 7,508,979 | B2 | * | 3/2009 | Comaniciu et al. | ........ | 382/154 |
| 7,519,201 | B2 |   | 4/2009 | Yang et al. | | |
| 7,606,425 | B2 |   | 10/2009 | Bazakos et al. | | |
| 7,650,030 | B2 |   | 1/2010 | Shan et al. | | |
| 8,175,326 | B2 | * | 5/2012 | Siegel | ................. | 382/100 |
| 8,611,611 | B2 | * | 12/2013 | Li et al. | ................. | 382/107 |
| 2003/0208289 | A1 | * | 11/2003 | Ben-Arie | ................. | 700/61 |
| 2009/0175540 | A1 | * | 7/2009 | Dariush et al. | ............ | 382/195 |
| 2010/0049675 | A1 |   | 2/2010 | Ning et al. | | |

OTHER PUBLICATIONS

"Accurate Realtime Full-body Motion Capture Using a Single Depth Camera" with Xiaolin Wei and Peizhao Zhang, ACM Transactions on Graphics (Presented at SIGGRAPH ASIA 2012), 31(6): Article No. 180.*
"Real-Time Human Pose Recognition in Parts from a Single Depth Image" Jamie Shotton, Andrew Fitzgibbon, Mat Cook, Toby Sharp, Mark Finocchio, Richard Moore, Alex Kipman, and Andrew Blake Jun. 2011.*

(Continued)

Primary Examiner — Utpal Shah
(74) Attorney, Agent, or Firm — Aaron Chatterjee; Peter Taylor; Micky Minhas

(57) ABSTRACT

A human subject is tracked within a scene of an observed depth image supplied to a general-purpose body-part tracker. The general-purpose body-part tracker is retrained for a specific scenario. The general-purpose body-part tracker was previously trained using supervised machine learning to identify one or more general-purpose parameters to be used by the general-purpose body-part tracker to track a human subject. During a retraining phase, scenario data is received that represents a human training-subject performing an action specific to a particular scenario. One or more special-purpose parameters are identified from the processed scenario data. The special-purpose parameters are selectively used to augment or replace one or more general-purpose parameters if the general-purpose body-part tracker is used to track a human subject performing the action specific to the particular scenario.

20 Claims, 9 Drawing Sheets

(56) References Cited

OTHER PUBLICATIONS

Panagiotakis, et al., "Unsupervised Human Members Tracking Based on an Silhouette Detection and Analysis Scheme", Retrieved at <<http://ceur-ws.org/Vol-475/Art|Bio/14-pp-134-141-305.pdf>>, 5th IFIP Conference on Artificial Intelligence Applications & Innovations (AIAI 2009), Apr. 23, 2009, pp. 134-141.

Song, et al., "Unsupervised Learning of Human Motion", Retrieved at <<http://ieeexplore.ieee.org/stamp/stamp.jsp?tp=&arnumber=1206511>>, IEEE Transactions on Pattern Analysis and Machine Intelligence, Jul. 2003, pp. 814-827.

Problem States for Pose Tracking Pipeline, U.S. Appl. No. 13/327,098, filed Dec. 15, 2011, pp. 76.

* cited by examiner

SCENARIO-SPECIFIC BODY-PART TRACKING

BACKGROUND

Optical tracking of a human subject may be used to control electronic devices such as computers and gaming consoles. For example, a human subject may provide a control input to an electronic device by moving his or her body within a scene observed by an optical sensor. With at least some electronic devices, an image of the human subject captured by the optical sensor may be analyzed to create a model of the human subject, which may be translated into a control input for the electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A general-purpose body-part tracker is retrained for a specific scenario. The general-purpose body-part tracker was initially trained using supervised machine learning to identify one or more general-purpose parameters to be used by the general-purpose body-part tracker to track a human subject.

During a retraining phase, scenario data is received by the general-purpose body-part tracker that represents a human training-subject performing an action specific to a particular scenario. The scenario data is processed by iterating over a set of different instances of the scenario data with the general-purpose body-part tracker. One or more special-purpose parameters are identified by the general-purpose body-part tracker from the processed scenario data. The special-purpose parameters are selectively used by the general-purpose body-part tracker to augment or replace one or more general-purpose parameters if the general-purpose body-part tracker is used to track a human subject performing the action specific to the particular scenario. This type of retraining may be performed without supervision, with supervision, with limited supervision, or with reinforcement learning.

DETAILED DESCRIPTION

Figure 1A:
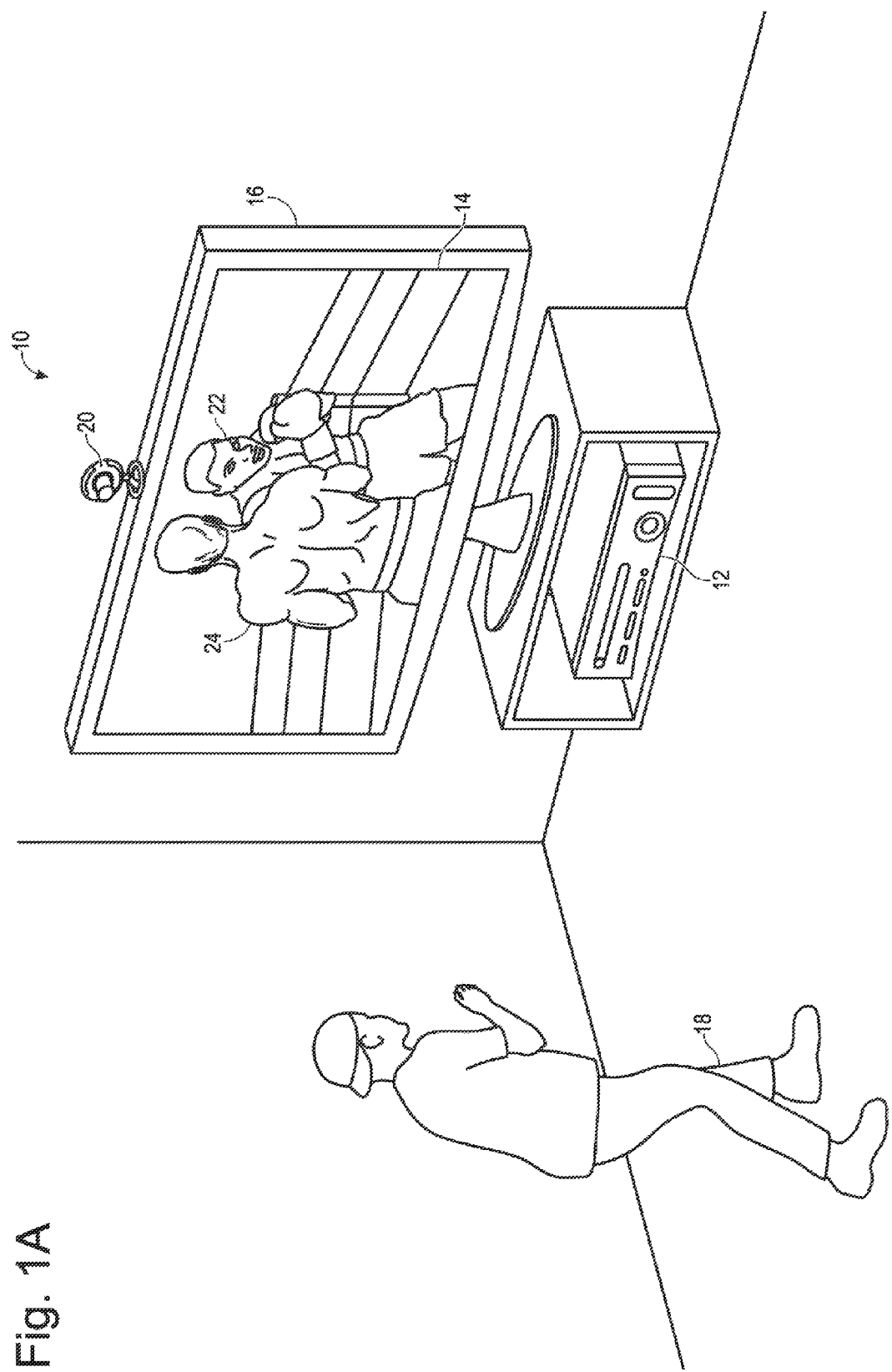
FIG. 1A shows an embodiment of an exemplary recognition, analysis, and tracking system tracking a human subject.

A body-part tracker may be used to track one or more human subjects within a scene observed by one or more optical sensors. The body-part tracker may process optical sensor data to identify a body model that is representative of an observed human subject. A body-part tracker that is intended for use by a variety of different application programs across a diverse range of scenarios may be referred to as a general-purpose body-part tracker. This general-purpose body-part tracker is expected to function reasonably well across a variety of different application programs and a diverse range of scenarios.

An individual application program may present a more limited range of scenarios in which a human subject is expected to perform actions that are specific to those scenarios. As an example, a boxing game may present boxing scenarios in which a game-player is expected to perform punches, blocks, dodges, and other actions specific to the boxing scenario. Each scenario may include one or more actions. Actions particular to a scenario may take the form of poses, motions, or gestures performed by the human subject in view of the optical sensors. For example, within a golf scenario, actions may include club selection, viewing the green, teeing up, swinging, celebrating, etc. As another example, within a dancing scenario, actions may include dozens of different dance movements. A selected action by a human subject within a scenario having a variety of supported actions is often not predictable by the developer.

A general-purpose body-part tracker may be retrained for a particular scenario presented by an application program to achieve improved or enhanced tracking results for that scenario. The unsupervised retraining described herein against a single action or against multiple actions per scenario may be of considerable value to developers. Yet, some forms of retraining may involve unduly prohibitive technical expertise, cost, time, or coordination. For example, some forms of machine learning may involve the use of human supplied "ground truth" annotations of the training data, assurances of statistically representative training sets, skilled human supervision, etc. The techniques described herein may be used to accomplish retraining of a general-purpose body-part tracker without such prohibitive technical expertise, cost, time, or coordination.

According to one such technique, for each scenario of an application program, an application program developer or other suitable entity may obtain a set of sensor recordings in which a human training-subject is performing one or more actions. Continuing with the example above, a developer of the boxing game may obtain a set of sensor recordings in which various game training subjects perform various boxing actions. The body-part tracker, in retraining mode, may be supplied with a set of different instances of this scenario data. One or more unique actions may be available to or expected of the human subject per scenario. As another example, on the driving line in a golf-themed application program, an action that is available to or expected of the human subject may include the human subject driving a golf ball. As yet another example, in a football-themed application program in which the human subject represents a quarterback, a plurality of actions may be available to or expected of the human subject, including a passing action, a running action, a dodging action, etc.

During retraining, the body-part tracker produces a set of special-purpose parameters per scenario based on the scenario data supplied to the tracker. The special-purpose parameters may be subsequently used by the body-part tracker to improve or otherwise enhance tracking of human subjects performing actions that are specific to a particular scenario. As one example, the one or more special-purpose parameters influence selection of a three-dimensional position of one or more points defining the body model of the human subject.

A set of special-purpose parameters may be associated with a scenario identifier. The scenario identifier may be shared between an application program and the body-part tracker. As one example, an application program may provide a scenario identifier to the body-part tracker to indicate that one or more special-purpose parameters are to be used by the body-part tracker. For example, at runtime of the application program, the application program may signal to the body-part tracker that the special-purpose parameters are applicable to a particular scenario. The body-part tracker may retrieve and use the special-purpose parameters to replace or augment general-purpose parameters to enhance tracking of human subjects for that particular scenario. As another example, the body-part tracker may provide the scenario identifier to an application program to indicate the presence of a particular scenario, thereby enabling the application program to gain scenario awareness.

Before discussing retraining of a body-part tracker in detail, an example body-part tracker and its pose-tracking pipeline are described in further detail with reference to FIGS. 1-8. Referring to FIG. 1A, a non-limiting example of a tracking system 10 is shown. In particular, FIG. 1A shows a computer gaming system 12 that may be used to play a variety of different games, play one or more different media types, and/or control or manipulate non-game application programs. FIG. 1A also shows a display 14 in the form of a high-definition television, or HDTV 16, which may be used to present game visuals to game players, such as human subject 18. Furthermore, FIG. 1A shows a capture device in the form of a depth camera 20, which may be used to visually monitor one or more game players, such as human subject 18. The example shown in FIG. 1A is non-limiting. As described below with reference to FIG. 2, a variety of different types of tracking systems may be used without departing from the scope of this disclosure.

A tracking system that includes a body-part tracker may be used to recognize, analyze, and/or track one or more targets, such as human subject 18. FIG. 1A shows a scenario in which human subject 18 is tracked by a body-part tracker using depth camera 20 so that the movements of human subject 18 may be interpreted by gaming system 12 as controls that can be used to affect the game being executed by gaming system 12. In other words, human subject 18 may use his or her movements to control the game. The movements of human subject 18 may be interpreted as virtually any type of user input.

Figure 1B:
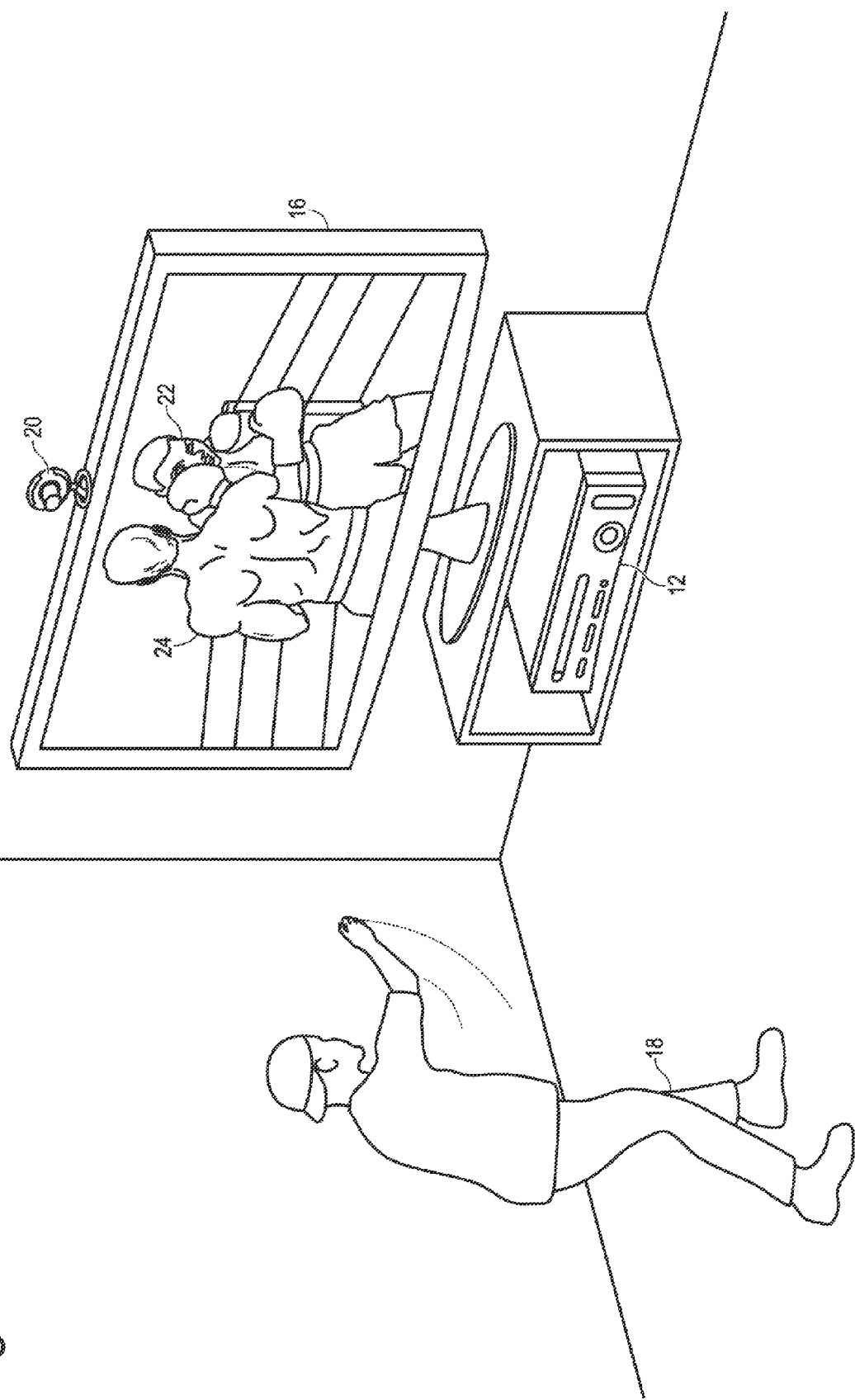
FIG. 1B shows the human subject of FIG. 1A tracked by the tracking system.

The example scenario illustrated in FIG. 1A shows human subject 18 playing a boxing game that is being executed by gaming system 12. The gaming system uses HDTV 16 to visually present a boxing opponent 22 to human subject 18. Furthermore, the gaming system uses HDTV 16 to visually present a player avatar 24 that human subject 18 controls with his or her movements. As shown in FIG. 1B, human subject 18 can throw a punch in physical/world space as an instruction for player avatar 24 to throw a punch in game/virtual space. Gaming system 12 and depth camera 20 can be used to recognize and analyze the punch of human subject 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to human subject 18 throwing a punch in physical space.

Other movements by human subject 18 may be interpreted as other controls, such as controls to bob, weave, shuffle, block, jab, or throw a variety of different punches. Furthermore, some movements may be interpreted as user inputs that serve purposes other than controlling player avatar 24. For example, the human subject may use movements to end, pause, or save a game, select a game level, view high scores, communicate with a friend or other player, etc.

In some embodiments, a target to be tracked may include a human subject and a physical object. In such embodiments, for example, a human subject may be holding a physical object, such that the motions of the human subject and the physical object are utilized to adjust and/or control parameters of an electronic game or other suitable application program. For example, the motion of a human subject holding a physical implement such as a racket or golf club may be tracked and utilized for controlling an on-screen racket or golf club in an electronic sports-themed game. In another example, the motion of a human subject holding a physical object may be tracked and utilized for controlling an on-screen weapon in an electronic combat-themed game.

Tracking systems that include a body-part tracker may be used to interpret movements of a target (e.g., a human subject) as operating system and/or application program controls that are outside the realm of gaming. Virtually any controllable aspect of an operating system and/or application program, such as the boxing game shown in FIGS. 1A and 1B, may be controlled by movements of a target, such as human subject 18. The illustrated boxing scenario is provided as an example, but is not meant to be limiting in any way. To the contrary, the illustrated scenario is intended to demonstrate a general concept, which may be applied to a variety of different scenarios without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 2:
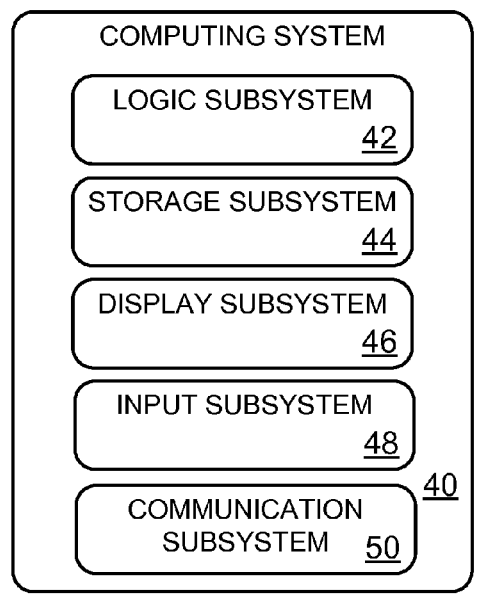
FIG. 2 schematically shows a computing system in accordance with an embodiment of the present disclosure.

FIG. 2 schematically shows a non-limiting embodiment of a computing system 40 that can enact one or more of the methods and processes described above. Computing system 40 is shown in simplified form. It will be understood that virtually any computer architecture may be used without departing from the scope of this disclosure. In different embodiments, computing system 40 may take the form of a mainframe computer, server computer, desktop computer, laptop computer, tablet computer, home-entertainment computer, network computing device, gaming device, mobile computing device, mobile communication device (e.g., smart phone), etc.

Computing system 40 includes a logic subsystem 42 and a storage subsystem 44. Computing system 40 may optionally include a display subsystem 46, input subsystem 48, communication subsystem 50, and/or other components not shown in FIG. 2.

Logic subsystem 42 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 44 includes one or more physical, non-transitory, devices configured to hold data and/or instructions executable by the logic subsystem to implement the methods and processes described herein. When such methods and processes are implemented, the state of storage subsystem 44 may be transformed—e.g., to hold different data.

Storage subsystem 44 may include removable media and/or built-in devices. Storage subsystem 44 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 44 may include volatile, nonvolatile, dynamic, static, read/write, read-only, random-access, sequential-access, location-addressable, file-addressable, and/or content-addressable devices.

It will be appreciated that storage subsystem 44 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 42 and of storage subsystem 44 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 40 implemented to perform a particular function. In some cases, a module, program, or engine may be instantiated via logic subsystem 42 executing instructions held by storage subsystem 44. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc When included, display subsystem 46 may be used to present a visual representation of data held by storage subsystem 44. This visual representation may take the form of a graphical user interface (GUI). As the herein described methods and processes change the data held by the storage subsystem, and thus transform the state of the storage subsystem, the state of display subsystem 46 may likewise be transformed to visually represent changes in the underlying data. Display subsystem 46 may include one or more display devices utilizing virtually any type of technology. Such display devices may be combined with logic subsystem 42 and/or storage subsystem 44 in a shared enclosure, or such display devices may be peripheral display devices.

When included, input subsystem 48 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 50 may be configured to communicatively couple computing system 40 with one or more other computing devices. Communication subsystem 50 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 40 to send and/or receive messages to and/or from other devices via a network such as the Internet.

Figure 3:
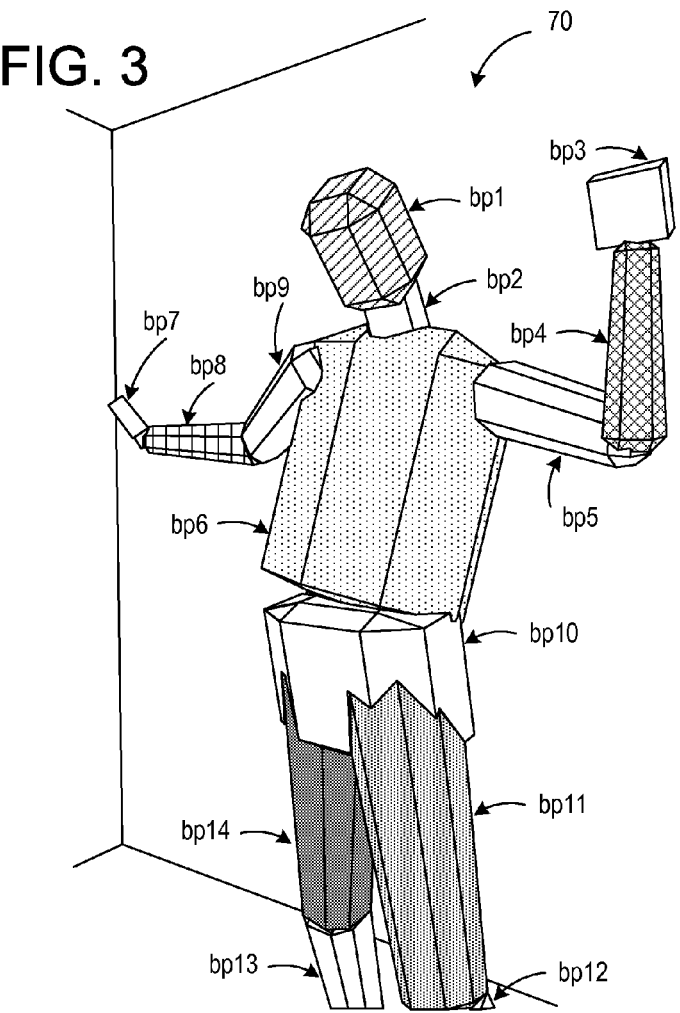
FIG. 3 shows an exemplary body model used to represent a human subject in accordance with an embodiment of the present disclosure.

FIG. 3 shows a non-limiting visual representation of an example body model 70. Body model 70 is a machine representation of a modeled target (e.g., human subject 18 from FIGS. 1A and 1B). The body model may include one or more data structures that include a set of variables that collectively define the modeled target in the language of a game or other application/operating system.

A model of a human subject can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of a modeled human subject. Each body part is a three-dimensional shape. For example, bp3 is a rectangular prism that represents the left hand of a modeled human subject, and bp5 is an octagonal prism that represents the left upper-arm of the modeled human subject. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human subject may include a plurality of rigid and/or deformable body parts. Some of these body parts may represent a corresponding anatomical body part of the human subject. Further, each body part of the model may comprise one or more structural members (i.e., "bones" or skeletal parts), with joints located at the intersection of adjacent bones. It is to be understood that some bones may correspond to anatomical bones in a human subject and/or some bones may not have corresponding anatomical bones in the human subject.

Figure 4:
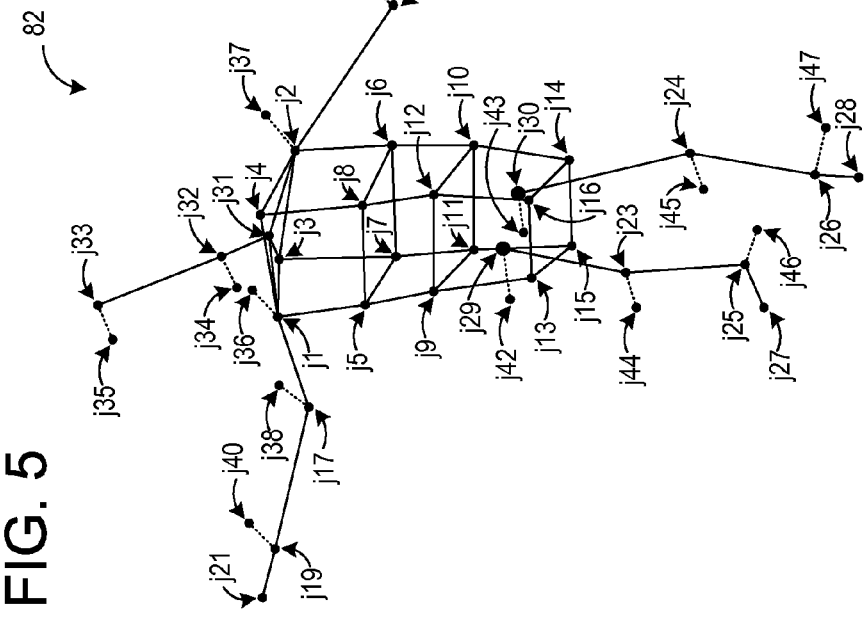
FIG. 4 shows a substantially frontal view of an exemplary skeletal model used to represent a human subject in accordance with an embodiment of the present disclosure.
Figure 5:
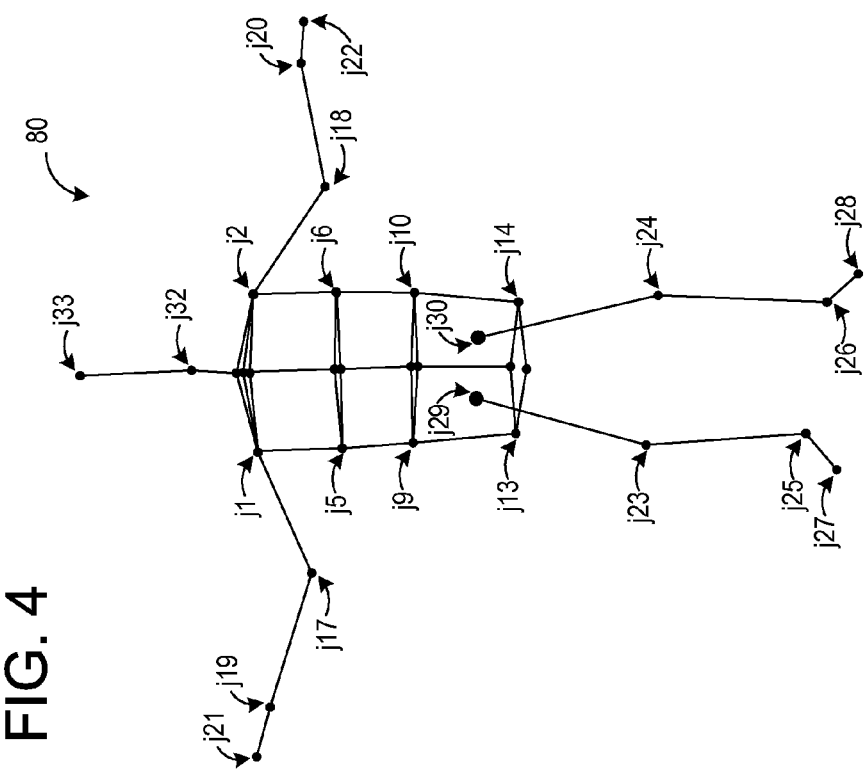
FIG. 5 shows a skewed view of an exemplary skeletal model used to represent a human subject in accordance with an embodiment of the present disclosure.

The bones and joints may collectively make up a skeletal model (e.g., a virtual skeleton), which may be a constituent element of the body model. In some embodiments, a skeletal model may be used in addition to or instead of another type of model, such as body model 70 of FIG. 3. The skeletal model may include one or more skeletal members for each body part and/or a joint between adjacent skeletal members. In other words, a virtual skeleton that includes a plurality of points defined in three-dimensional space may serve as this type of skeletal model. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33.

Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle. A skeletal model may include more or fewer joints without departing from the spirit of this disclosure.

As described above, some models may include a skeleton and/or other body parts that serve as a machine representation of a modeled target. In some embodiments, a model may alternatively or additionally include a wireframe mesh, which may include hierarchies of rigid polygonal meshes, one or more deformable meshes, or any combination of the two.

The above described body part models and skeletal models are non-limiting example types of models that may be used as machine representations of a modeled human subject. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking.

As mentioned above, a model serves as a representation of a target, such as human subject 18 in FIGS. 1A and 1B. As the human subject moves in physical space, information from a capture device, such as depth camera 20 in FIGS. 1A and 1B, can be used to adjust a pose and/or the fundamental size/shape of the model so that the model more accurately represents the human subject.

Figure 6:
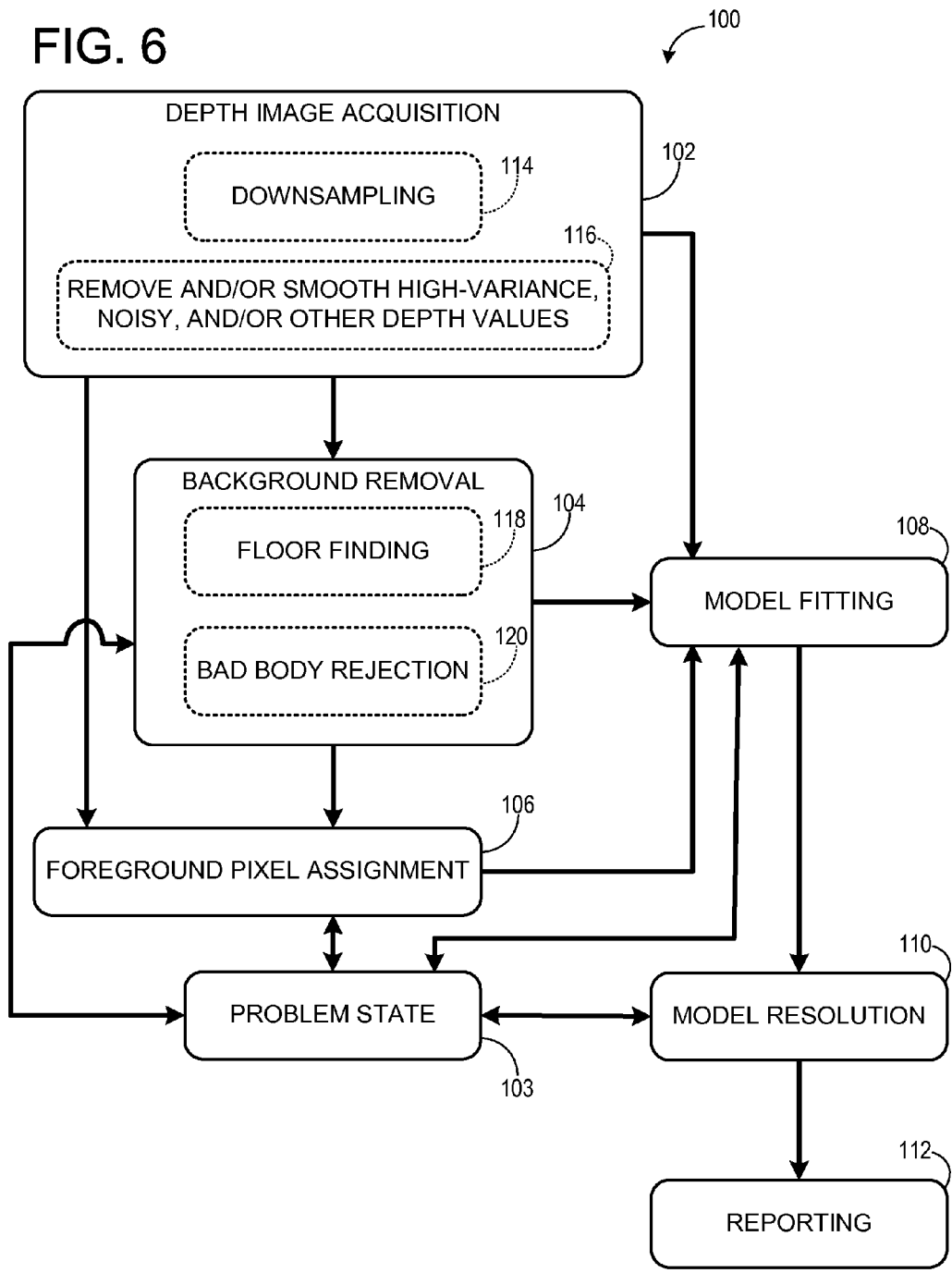
FIG. 6 shows a pose-tracking pipeline for tracking a human subject in accordance with an embodiment of the present disclosure.

FIG. 6 shows a flow diagram of an example pose-tracking pipeline 100 of a body-part tracker for tracking one or more human subjects. Pose-tracking pipeline 100 may be executed by a computing system (e.g., gaming system 12 shown in FIG. 1A and/or computing system 40 shown in FIG. 2) to track one or more human subjects interacting with an electronic game or other suitable application program. As introduced above, tracking of the human subjects allows physical movements of those human subjects to act as real-time user controls that adjust and/or control parameters of an electronic game. It is to be understood that gaming is provided as a non-limiting example, and the disclosed pipeline may be used to track human and/or nonhuman targets for a variety of other purposes.

The disclosed pipeline can be used to accurately and efficiently track one or more human subjects that are present in the field of view of a depth camera. The pipeline can model and track one or more human subjects in real time (i.e., a currently-observed human subject), thus providing a responsive, immersive, and realistic experience for a human subject being tracked.

In some embodiments, pose-tracking pipeline 100 includes six conceptual processes: depth image acquisition 102, background removal process 104, foreground pixel assignment process 106, model fitting process 108, model resolution process 110, and reporting 112. Information identifying an existing problem state (e.g., problem state 103) may be supplied to one or more of these processes where the information may be used by these processes to output a virtual skeleton or other suitable model representing the human subject.

Depth image acquisition 102 may include receiving an observed depth image of the human subject from a source. In some embodiments, the source may be a depth camera configured to obtain depth information about the human subject via time-of-flight analysis, structured light analysis, stereo vision analysis, or other suitable technique. The observed depth image may include a plurality of observed pixels, where each observed pixel has an observed depth value. The observed depth value includes depth information of the human subject as viewed from the source.

The depth image may optionally be represented as a pixel matrix that includes, for each pixel address, a depth value indicating a world space depth from the plane of the depth camera, or another suitable reference plane, to a surface at that pixel address.

Figure 7:
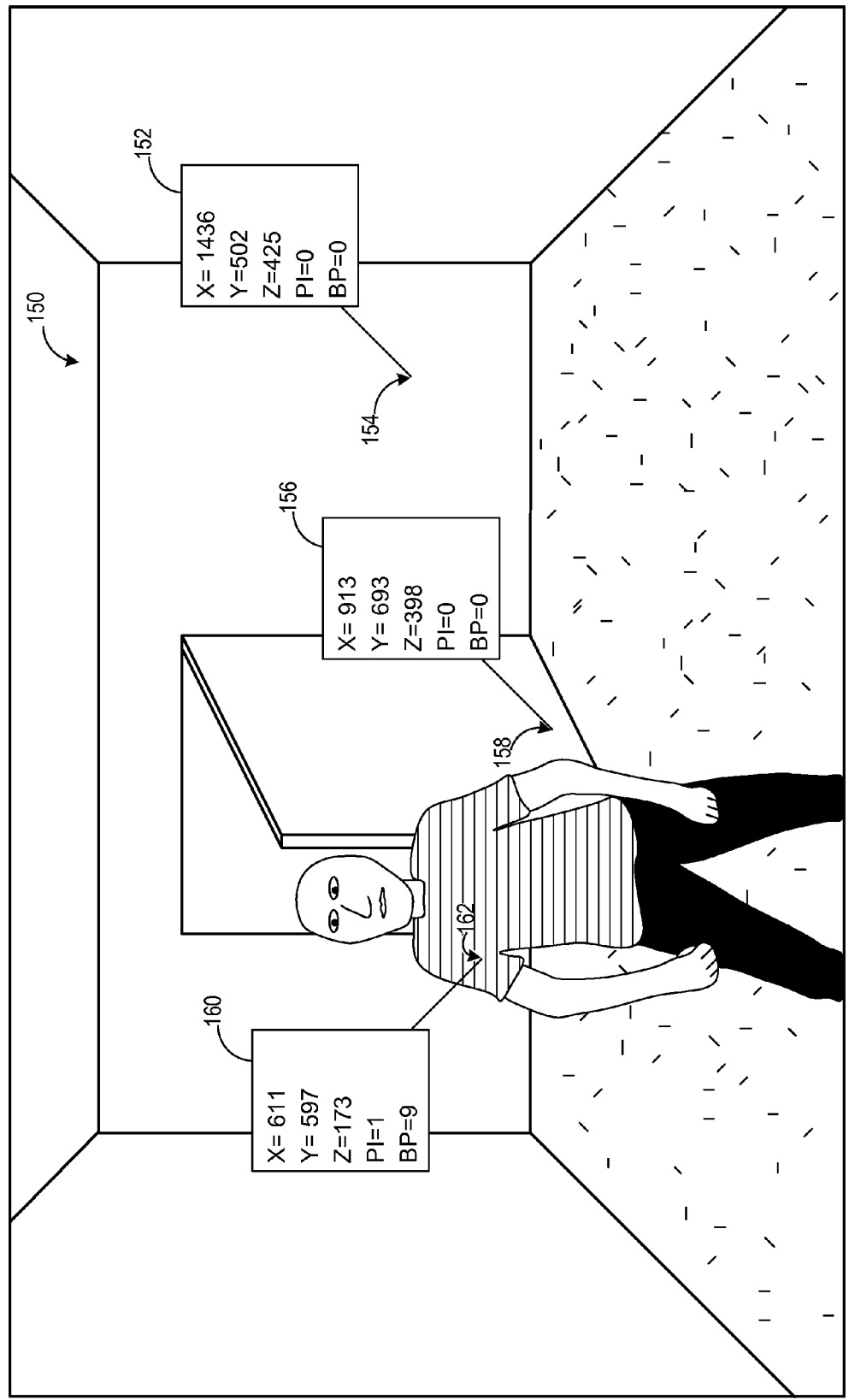
FIG. 7 shows a scene as viewed by a depth camera with schematic data structures showing data used to track a human subject.

FIG. 7 schematically shows a scene 150 captured by a depth camera. The depth camera determines a Z-value of a surface at each pixel address. As an example, FIG. 7 schematically shows a data structure 152 used to represent pixel 154 at pixel address [1436, 502]. Data structure 152 may be an element of a pixel matrix, for example. Data structure 152 includes a Z-value of 425 for pixel 154, thus indicating that the surface at that pixel address, in this case a wall, is 425 units deep in world space. As another example, a data structure 156 is used to represent pixel 158 at pixel address [928, 693]. Data structure 156 includes a Z-value of 398 for pixel 158, thus indicating that the surface at that pixel address, in this case a door, is 398 units deep in world space. As another example, a data structure 160 is used to represent pixel 162 at pixel address [611, 597]. Data structure 160 includes a Z-value of 173 for pixel 162, thus indicating that the surface at that pixel address, in this case a human subject, is 173 units deep in world space. While three pixels are provided as examples above, it is to be understood that some or all pixels captured by a capture device, or a downsampled set thereof, may be represented in this manner.

As shown at 114 of FIG. 6, depth image acquisition 102 may optionally include downsampling the observed depth image to a lower processing resolution. Downsampling to a lower processing resolution may allow the observed depth image to be more easily utilized and/or more quickly processed with less computing overhead.

As shown at 116 of FIG. 6, depth image acquisition 102 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity and/or speed for future calculations.

Background removal process 104 may include distinguishing targets such as human subjects that are to be tracked from non-target background elements in the observed depth image. As used herein, the term "background" is used to describe anything in the scene that is not part of the target(s) to be tracked. The background may include elements that are in front of (i.e., closer to the depth camera) than the target(s) to be tracked. Distinguishing foreground elements that are to be tracked from background elements that may be ignored can increase tracking efficiency and/or simplify downstream processing.

Background removal process 104 may include assigning each data point (e.g., pixel) of the processed depth image a player index that identifies that data point as belonging to a particular human subject or to a non-target background element. When such an approach is used, pixels or other data points assigned a background index can be removed from consideration in one or more subsequent phases of pose-tracking pipeline 100.

As an example, pixels corresponding to a first human subject can be assigned a player index equal to one, pixels corresponding to a second human subject can be assigned a player index equal to two, and pixels that do not correspond to a human subject can be assigned a player index equal to zero. Such player indices can be saved or otherwise stored in any suitable manner. In some embodiments, a pixel matrix may include, at each pixel address, a player index indicating if a surface at that pixel address belongs to a background element, a first human subject, a second human subject, etc. For example, FIG. 7 shows data structure 152 including a player index equal to zero for wall pixel 154, data structure 156 including a player index equal to zero for door pixel 158, and data structure 160 including a player index equal to one for pixel 162 of a human subject. While this example shows the player/background indices as part of the same data structure that holds the depth values, other arrangements are possible. In some embodiments, depth information, player/background indices, body part indices, body part probability distributions, and other information may be tracked in a common data structure, such as a matrix addressable by pixel address. In other embodiments, different masks may be used to track information through pose-tracking pipeline 100. The player index may be a discrete index or a fuzzy index indicating a probability that a pixel belongs to a particular target (e.g., human subject) and/or the background.

A variety of different background removal techniques may be used. Some background removal techniques may use information from one or more previous frames to assist and improve the quality of background removal. For example, a depth history image can be derived from two or more frames of depth information, where the depth value for each pixel is set to the deepest depth value that pixel experiences during the sample frames. A depth history image may be used to identify moving objects in the foreground of a scene (e.g., a human subject) from the nonmoving background elements. In a given frame, the moving foreground pixels are likely to have depth values that are smaller than the corresponding depth values (at the same pixel addresses) in the depth history image. In a given frame, the nonmoving background pixels are likely to have depth values that match the corresponding depth values in the depth history image.

As one non-limiting example, a connected island approach may be used for background removal. Using a connected island approach, an input depth stream can be used to generate a set of samples (e.g., voxels) that can be conceptually unprojected back into world space. Foreground objects are then isolated from background objects using information from previous frames. In particular, the process can be used to determine whether one or more voxels in the grid are associated with a background by determining whether an object of the one or more objects in the grid is moving. The output from this process can be used to assign each data point (e.g., pixel) a player index or a background index.

Additional or alternative background removal techniques can be used to assign each data point a player index or a background index, or otherwise distinguish foreground targets from background elements. In some embodiments, particular portions of a background may be identified. For example, at 118 of FIG. 6, a floor in a scene may be identified as part of the background. In addition to being removed from consideration when processing foreground targets, a found floor can be used as a reference surface that can be used to accurately position virtual objects in game space, stop a flood-fill that is part of generating a connected island, and/or reject an island if its center is too close to the floor plane.

A variety of different floor finding techniques may be used. In some embodiments, a depth image can be analyzed in screen space row by row. For selected candidate rows of the screen space depth image (e.g., rows near the bottom of the image), a straight depth line can be interpolated through two candidate points that are believed to be located on a floor surface. Boundary lines can then be fit to endpoints of the straight depth lines. The boundary lines can be averaged and used to define a plane that is believed to correspond to the floor surface.

In other embodiments, a floor finding technique may use three points from a depth image to define a candidate floor surface. The three points used to define the candidate can be randomly selected from a lower portion of the depth image, for example. If the normal of the candidate is substantially vertical in world space, the candidate is considered, and if the normal of the candidate is not substantially vertical, the candidate can be rejected. A candidate with a substantially vertical normal can be scored by counting how many points from the depth image are located below the candidate and/or what the average distance such points are below the candidate. If the number of points below the candidate exceeds a threshold and/or the average distance of points below the candidate exceeds a threshold, the candidate can be rejected. Different candidates are tested, and the candidate with the best score is saved. The saved candidate may be blessed as the actual floor if a predetermined number of candidates with lower scores are tested against the saved candidate.

Additional or alternative background removal techniques can be used to assign each data point a player index or a background index, or otherwise distinguish foreground targets from background elements. For example, in FIG. 6 pose-tracking pipeline 100 includes bad body rejection 120. In some embodiments, objects that are initially identified as foreground objects can be rejected because they do not resemble any known target. For example, an object that is initially identified as a foreground object can be tested for basic criteria that are to be present in any objects to be tracked (e.g., head and/or torso identifiable, bone lengths within predetermined tolerances, etc.). If an object that is initially identified as being a candidate foreground object fails such testing, the object may be reclassified as a background element and/or subjected to further testing. In this way, moving objects that are not to be tracked, such as a chair pushed into the scene, can be classified as background elements because such elements do not resemble a human subject.

Recognition, analysis, and tracking of a human subject may include consideration of problem states. An identification of zero, one, or more problem states may be supplied to a pose-tracking pipeline or may be identified by the pose-tracking pipeline. The pose-tracking pipeline may select a three-dimensional position of one or more of the skeletal points in accordance with the identification of zero, one, or more problem states.

A problem state may refer to a pre-defined state of a human subject within an observed scene. The existence of one or more of these problem states within an observed scene may decrease the accuracy or increase the uncertainty of pose recognition. However, the accuracy and certainty of the pose recognition may be improved by identifying whether zero, one, or more problem states exists within a scene, and by providing the pipeline with information identifying the existing problem state so that the pipeline is able to tune processing for that particular problem state.

Example problem states may include: an occluded state in which a portion of the human subject is occluded by another object within the observed scene, a cropped state in which a portion of the human subject resides outside of the observed scene, a proximate state in which a portion of the human subject resides at the same or similar depth within the scene as another object, a crossed state in which a portion of the human subject has crossed a virtual boundary into a region where that portion of the human subject does not usually reside, and a velocity limited state in which a portion of the human subject moves at a rate that exceeds an upper or lower velocity threshold. However, other suitable problem states may be identified.

In some embodiments, an indication of zero, one, or more problem states (e.g., problem state 103) may be output from the background removal process 104. This indication may take the form of information derived from an observed depth image by the pose-tracking pipeline. As such, background removal process 104 may output a message that a certain problem state exists instead of or in addition to pixel classification information classifying each pixel of an observed depth image as either a foreground pixel belonging to the human subject or a background pixel not belonging to the human subject. The message and/or pixel classification information output by background removal process 104 may be used by another process, such as a problem state module to identify and supply an identification of zero, one, or more problem states to the pose-tracking pipeline.

In some embodiments, an identification of zero, one, or more problem states (e.g., problem state 103) may be supplied to the background removal process 104. The identification of the zero, one, or more problem states may be considered by the background removal process when classifying each pixel of an observed depth image (e.g., the observed depth image from which the problem state was identified or subsequent depth images that are processed by the pose-tracking pipeline) as either a foreground pixel belonging to the human subject or a background pixel not belonging to the human subject. As another example, a segmentation module may output classification information (e.g., probabilistic or soft classification and/or hard classification) of each depth pixel as background or belonging to a particular subject. The segmentation module may also provide other suitable indicators, such as proximity relationships between foreground and background regions, relevant changes in the minimum or maximum depth plates, etc.

In some examples, an identified problem state, such as a proximate state in which a portion of a human subject resides at the same or similar depth within the scene as another object may be used by the pipeline to refine foreground/background separation in a limited region of the depth image. The limited region may correspond to the region of the depth image where the problem state is present (e.g., the region including or surrounding the portion of the human subject). Techniques deemed too computationally intensive to apply to an entire depth image may be selectively applied, such as to separate a subject's arm from an arm rest of a chair or other object within the scene. Similarly, identification of an occluded state in which an object resides in front of a portion of the human subject may be used by the pipeline to refine foreground/background separation in a limited region of the depth image corresponding to the occluded portion of the human subject. This approach is in contrast to a connected island approach (e.g., where all portions of the human subject are assumed to be connected to each other within the observed depth image). The connected island approach may cause objects within the scene to be erroneously classified as belonging to the human subject, for example, if an object occludes the human subject in a manner that creates the appearance that the human subject is divided into two or more portions within the observed depth image. After foreground pixels are distinguished from background pixels, pose-tracking pipeline 100 further classifies the pixels that are considered to correspond to the foreground objects that are to be tracked. In particular, at foreground pixel assignment process 106 of FIG. 6, each foreground pixel is analyzed to determine what part of a human subject's body that foreground pixel is likely to belong.

A variety of different foreground pixel assignment techniques can be used to assess which part of a human subject's body, or a machine representation of the body, a particular pixel is likely to belong. A pixel matrix or other data structure may include, for each pixel address, a body part index, confidence value, and/or body part probability distribution indicating the part, or parts, to which a pixel is likely to belong. For example, FIG. 7 schematically shows data structure 160 including a body part index equal to nine, which corresponds to an upper, right arm, for pixel 162 of a human subject. In the simplified version of FIG. 7, the body part index is resolved to a single candidate body part (i.e., body part nine). In practice, the body part information may be a soft labeling that is represented as a histogram over possible body parts for each pixel. In other words, a probability distribution of all likely body parts may be used in some embodiments, as described in more detail below.

As one non-limiting example, machine-learning can be used to assign each foreground pixel a body part index and/or body part probability distribution. The machine-learning approach analyzes a foreground object using information learned from analyzing a prior-trained collection of known poses. This approach can be used to assign each foreground pixel a body part index or distribution without any prior context (i.e., knowledge of the prior frame is not needed).

In some embodiments, the machine-learning foreground pixel assignment may utilize one or more decision trees to analyze each foreground pixel of interest in an observed depth image. Such analysis can find a best-guess of the body part for that pixel and the confidence that the best-guess is correct. In some embodiments, the best-guess may include a probability distribution over two or more possible body parts, and the confidence may be represented by the relative probabilities of the different possible body parts.

At each node of the decision tree, an observed depth value comparison between two pixels is made, and, depending on the result of the comparison, a subsequent depth value comparison between two pixels is made at the child node of the decision tree. The result of such comparisons at each node determines the pixels that are to be compared at the next node. The terminal nodes of each decision tree result in a body part classification and associated confidence in the classification.

In some embodiments, subsequent decision trees may be used to iteratively refine the best-guess of the body part for each pixel and the confidence that the best-guess is correct. For example, once the pixels have been classified with the first classifier tree (based on neighboring depth values), a refining classification may be performed to classify each pixel by using a second decision tree that looks at the previous classified pixels and/or depth values. A third pass may also be used to further refine the classification of the current pixel by looking at the previous classified pixels and/or depth values. It is to be understood that virtually any number of iterations may be performed, with fewer iterations resulting in less computational expense and more iterations potentially offering more accurate classifications and/or confidences.

The decision trees may be constructed during a training mode in which a sample of known models in known poses are analyzed to determine the questions (i.e., classifiers or tests) that can be asked at each node of the decision trees in order to produce accurate pixel classifications. As described in further detail with reference to FIGS. 9-11, training and retraining of a body-part tracker may be used to identify parameters that are used in combination with these classifiers and/or regressors to support tracking of human subjects.

In some embodiments, an indication of zero, one, or more problem states (e.g., problem state 103) may be output from the foreground pixel assignment process 106. This indication may take the form of information derived from an observed depth image by the pose-tracking pipeline. As such, foreground pixel assignment process 106 may output a message that a certain problem state exists instead of or in addition to pixel assignment information labeling each pixel of the observed depth image classified as a foreground pixel (e.g., a pixel belonging to the human subject) with body part information indicating a likelihood that that the foreground pixel belongs to one or more body parts of the human subject. The message and/or pixel assignment information output by pixel assignment process 106 may be used by another process, such as a problem state module to identify and supply an identification of zero, one, or more problem states to the pose-tracking pipeline.

In some embodiments, an identification of zero, one, or more problem states (e.g., problem state 103) may be supplied to the foreground pixel assignment process 106. The identification of zero, one, or more problem states may be considered by the foreground pixel assignment process when labeling each pixel of an observed depth image (e.g., the observed depth image from which the problem state was identified or subsequent depth images that are processed by the pose-tracking pipeline) classified as a foreground pixel with body part information indicating a likelihood that that the foreground pixel belongs to one or more body parts of the human subject. In some examples, a decision tree, such as one trained with a known pose set related to a particular problem state or a set of problem states, or a decision tree dedicated to a particular body part or a set of body parts likely to have specific problem states, may be selectively applied to corresponding problematic regions of pixels to determine whether the pixel is a foreground or background pixel.

Turning back to FIG. 6, after foreground pixels are labeled with body part information, pose-tracking pipeline 100 includes model fitting process 108, which finds one or more possible skeletons that serve as machine representations of the human subject.

A variety of different model fitting techniques may be used. During model fitting process 108, a human subject is modeled as a virtual skeleton including a plurality of skeletal points defined in three or more dimensions. The various skeletal points may correspond to actual joints of a human subject, terminal ends of a human subject's extremities, and/or points without a direct anatomical link to the human subject. Each skeletal point has at least three degrees of freedom (e.g., world space x, y, z). As such, the virtual skeleton can be fully defined by $3 \times \lambda$ values, where $\lambda$ is equal to the total number of skeletal points included in the skeleton. An example virtual skeleton with 31 skeletal points optionally can be defined by 93 values, for example. As described with reference to FIG. 5 above, some skeletal points may account for axial roll angles.

The various model fitting approaches compatible with pose-tracking pipeline 100 may use depth information, background information, body part information, prior trained anatomical and kinetic information, and/or zero, one, or more problem states (e.g., problem state 103) to deduce one or more skeleton(s) that closely model a human subject. Furthermore, one or more special purpose parameters associated with a particular scenario may be used to more accurately deduce virtual skeletons when a human subject is performing actions associated with the scenario.

The body part information that is assessed for the foreground pixels may be used to find one or more candidate locations (e.g., centroids) for one or more skeletal bones. Furthermore, a plurality of plausible virtual skeletons may be assembled to include skeletal bones at different combinations of the plurality of candidate locations. The various plausible virtual skeletons may then be scored, and the scored proposals can be combined into a final estimate.

Clumps of foreground pixels may individually include body part probability distributions indicating that a particular body part is probable for that clump. In some cases, two or more clumps that are spaced apart from one another may indicate that the same body part is probable. For example, the clumps of pixels actually showing the right and left hands of a target may both be labeled with body part information indicating a high probability for a right hand body part. As such, two or more centroid candidates may be calculated for each body part. Each centroid candidate for a particular body part may be represented in four dimensions—x, y, z and probability w that the candidate belongs to that body part. In other words, each centroid defines a location of a clump of neighboring foreground pixels individually having body part probability distributions indicating that that body part is probable for that clump of neighboring foreground pixels. Furthermore, each centroid defines a single probability representing all individual body part probability distributions within the clump.

Two or more different centroid candidates can be considered in finding a virtual skeleton that closely models a human subject. The various candidate centroids can be scored against one another (e.g., number of pixels in clump multiplied by average probability that pixels in the clump belong to a particular body part). The scores may be adjusted based on one or more constraints (e.g., apply a penalty when a distance between the highest scoring clump for a body part in a previous frame exceeds a threshold distance to the highest scoring clump for the same body part in the current frame). The scored centroids may be used to construct one or more plausible virtual skeletons, from which a single virtual skeleton can be derived.

Considering plural plausible virtual skeletons employs a probabilistic principle of least commitment to deal with uncertainty. As such, many possibilities may be considered throughout the model fitting phase of the pipeline, without necessarily requiring that hard decisions be made until such decisions can no longer be avoided.

If the data is unambiguous, the plurality of plausible virtual skeletons will be very similar to each other. If there are situations in which there are numerous possibilities for one or more parts of the virtual skeleton, the sample set will be more diverse, thus capturing the uncertainty.

The accuracy of the approximation can improve as the number of plausible virtual skeletons, n, increases. However, computational cost also increases as n increases. The model fitting phase of the pipeline can be restrained to focus on a relatively small number of samples (e.g., n<100). Another restraining technique may include pruning or selective reduction of samples based on scoring body part relationships. For example, if there is only one high confidence proposal for the neck of a human subject, then shoulder proposals which are too far from the neck may be rejected. Accordingly, the early rejection or preservation decisions on proposals may be influenced by the identification of zero, one, or more problem states. To improve results when working with fewer samples, information from foreground pixel assignment process 106 and past skeletal motion information may be used to improve the intelligence of the search for a set of proposal virtual skeletons. The plausible virtual skeletons can be evaluated against the input data (e.g., observed depth images and/or an identification of problem states supplied to the pose-tracking pipeline), and other sources of information, to arrive at a final approximation.

As shown in FIG. 6, model fitting process 108 may receive input from previous phases of pose-tracking pipeline 100 as well as zero, one, or more problem states (e.g., problem state 103). Model fitting process 108 may receive one or more raw depth images from depth image acquisition 102, player/background information from background removal process 104, and body part information from foreground pixel assignment process 106.

With all available inputs, foreground regions of the depth image may be segmented into a set of patches, which are regions of roughly consistent depth. This effectively approximates the full depth image by a set of small planar regions. For a modest loss of fidelity, this can reduce the bandwidth requirements from millions of pixel accesses, to thousands of patch accesses.

Plausible virtual skeletons may then be proposed from the previous foreground pixel assignments. The purpose of this phase is to convert pixel-wise body part probability distributions into proposals for full virtual skeletons (e.g., 93 values for a $\lambda=31$ skeleton). In the spirit of the principle of least commitment, all likely locations for a body part are considered until global information can be brought to bear. Therefore, this phase may include two components: a body part proposer, which extracts candidate locations from foreground pixel assignment process 106 for each body part independently (e.g., finding candidate centroids for each body part, as introduced above); and a virtual skeleton generator, which combines these candidates into complete virtual skeletons.

In some embodiments, an indication of zero, one, or more problem states (e.g., problem state 103) may be output from the model fitting process 108. This indication may take the form of information derived from an observed depth image by the pose-tracking pipeline. As such, model fitting process 108 may output a message that a certain problem state exists instead of or in addition to a set of one or more proposed virtual skeletons for an observed depth image in which at least one of the set of proposed virtual skeletons indicates the problem state. The message and/or set of one or more virtual skeletons output by model fitting process 108 may be used by another process, such as a problem state module used to identify and supply an identification of zero, one, or more problem states to the pose-tracking pipeline.

In some embodiments, an identification of zero, one, or more problem states (e.g., problem state 103) may be supplied to the model fitting process 108. The identification of zero, one, or more problem states may be considered by the model fitting process to identify a set of proposed virtual skeletons that are supplied to a model resolution process 110 for a given observed depth image (e.g., the observed depth image from which the problem state was identified or subsequent depth images that are processed by the pose-tracking pipeline).

As discussed above, in at least some embodiments, model fitting can be used to find a plurality of different plausible or proposed virtual skeletons. A proposed virtual skeleton can be scored using a variety of different metrics, including an identification of zero, one, or more problem states (e.g., problem state 103) that are supplied to the model resolution process 110. In FIG. 6, pose-tracking pipeline 100 includes model resolution process 110, in which a single virtual skeleton is derived from the plurality of plausible virtual skeletons. A variety of different model resolution techniques may be used. In some embodiments, two or more plausible virtual skeletons may be scored against each other based on weight, observed motion over time, anticipated bone length, foreground/background crossing, problem states, and/or other factors. A proposed virtual skeleton with a highest score may be selected; or the best scoring portions of two or more different proposed virtual skeletons, from one or more different frames, may be combined into a selected virtual skeleton. Furthermore, various constraints (e.g., bone length, joint angle, collision testing, etc.) may be applied to one or more virtual skeletons to shift the proposed skeleton(s) into a better matching pose.

In addition to or as an alternative to scoring based on problem states, scoring functions may be weighted according to the identified problem states. An example includes a scoring function that penalizes proposals in which a body part of a human subject cannot be connected to another body part without crossing through a proposed background region of the scene e.g. a wrist proposal that cannot be connected to an elbow proposal without crossing through a proposed background region). As a non-limiting example, such a scoring function may apply a penalty scaled by a factor that is based, at least in part, on a number of proposed background pixels crossed between the proposed body parts. When a problem state such as a proximate state is identified, the resulting penalty may be dampened (e.g., reduced) responsive to expected or identified ambiguity in background/foreground pixel classification, so that the scoring function has less of an effect or influence on the result than if the subject (or part of the subject) is more distant from a background object.

In some embodiments, an indication of zero, one, or more problem states (e.g., problem state 103) may be output from the model resolution process 110. This indication may take the form of information derived from an observed depth image by the pose-tracking pipeline. As such, model resolution process 110 may output a message that a certain problem state exists instead of or in addition to a selected virtual skeleton from the set of proposed virtual skeletons. The message and/or selected virtual skeleton output by model resolution process 110 may be used by another process, such as a problem state module to identify and supply an identification of zero, one, or more problem states to the pose-tracking pipeline.

In some embodiments, an identification of zero, one, or more problem states (e.g., problem state 103) may be supplied to the model resolution process 110. The identification of zero, one, or more problem states may be considered by the model resolution process to select a virtual skeleton from a set of proposed virtual skeletons for a given observed depth image (e.g., the observed depth image from which the problem state was identified or subsequent depth images that are processed by the pose-tracking pipeline). For example, the pose-tracking pipeline may select a three-dimensional position of at least one of the plurality of skeletal points in accordance with the identification of the problem state supplied to the pose-tracking pipeline at one or more of processes 104, 106, 108, and/or 110. In some examples, an identification of zero, one, or more problem states and/or information indicating the problem states may flow directly to reporting 112 or may be provided as an output through model resolution 110. The identification of problem states can be used by or be beneficial to other aspects of the tracking system in addition to or as an alternative to other outputs, such as skeletal models.

Pose-tracking pipeline 100 also includes reporting 112, where the selected skeleton is reported for use by other applications. Reporting can be performed in any suitable manner. As a non-limiting example, an application programming interface (API) may be used to report the selected skeleton. Such an (API) may be configured to communicate the joint positions, joint velocities, joint accelerations, confidences in positions, velocities, and/or accelerations, and/or other information related to the selected skeleton for one or more targets. A content receiver (e.g., a gaming application) may then use the reported information as desired.

Figure 8:
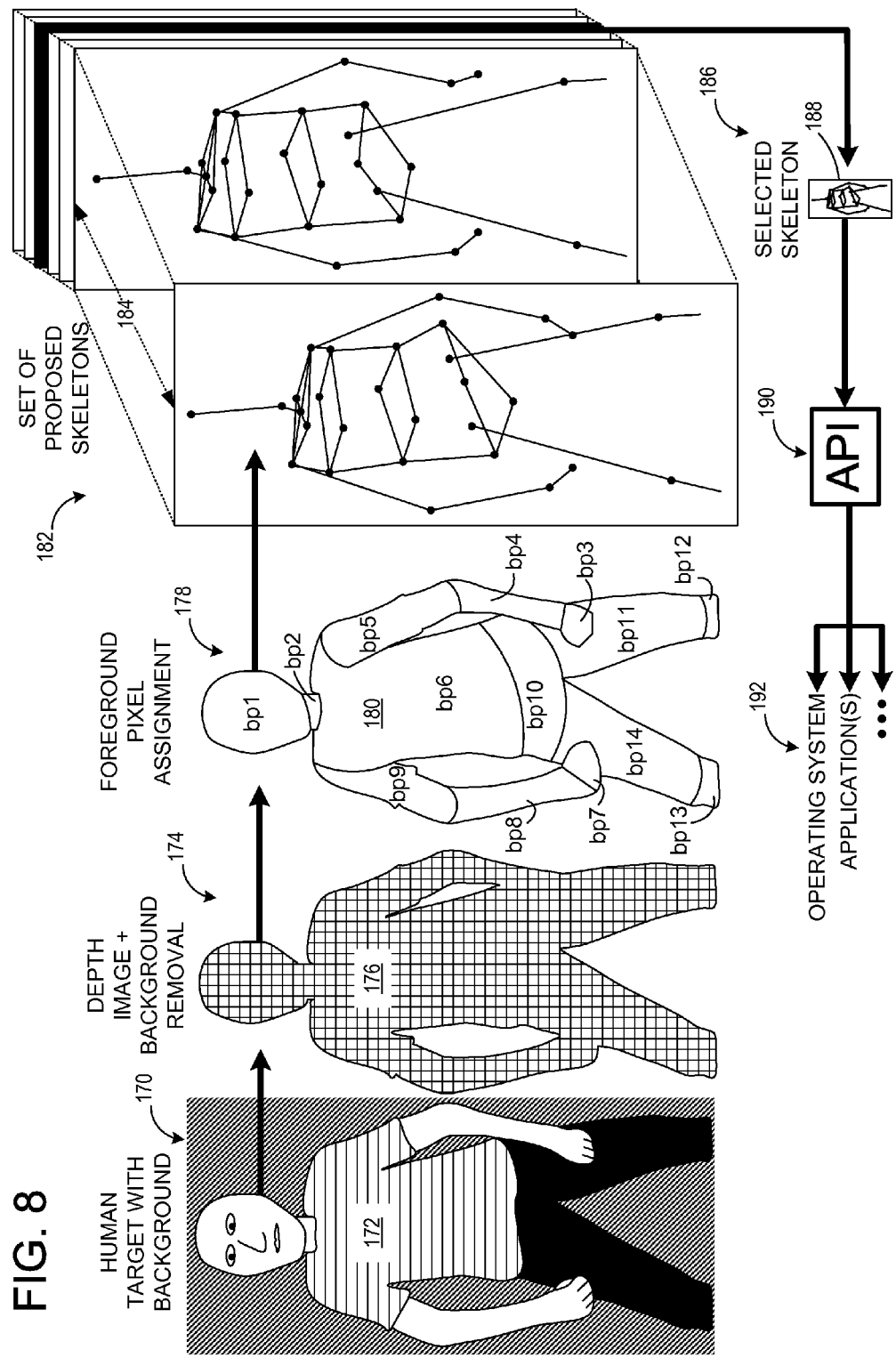
FIG. 8 schematically shows a progression of data through a pose-tracking pipeline in accordance with an embodiment of the present disclosure.

FIG. 8 graphically shows a progression of data through a pose-tracking pipeline of a body-part tracker. On the left, a scene 170 includes a human subject 172. At 174, scene 170 is imaged by a depth camera and background information is removed from the scene. Silhouette 176 schematically represents one or more data structures capturing the depth information and player index information (e.g., as captured during depth image acquisition 102 and background removal process 104 of pose-tracking pipeline 100).

At 178, the depth information believed to belong to the human subject is analyzed to determine what part of a human subject's body each pixel is likely to belong. Map 180 schematically represents one or more data structures capturing the body part information (e.g., as deduced during foreground pixel assignment process 106 of pose-tracking pipeline 100).

At 182, a set of plausible virtual skeletons are proposed, where each virtual skeleton is an attempt to model the human subject as a machine representation. Virtual skeleton set 184 schematically represents one or more data structures defining the proposed virtual skeletons (e.g., as proposed during model fitting process 108 of pose-tracking pipeline 100). It is to be understood that the graphical depictions of virtual skeletons in FIGS. 4, 5, and 8 is non-limiting. Virtual skeletons with a different number and/or configuration of skeletal points and skeletal bones may be used.

At 186, a virtual skeleton is selected based on the set of plausible virtual skeletons. Virtual skeleton 188 schematically represents one or more data structures defining the selected virtual skeleton (e.g., as selected during model resolution process 110 of pose-tracking pipeline 100).

At 190, the selected virtual skeleton is reported (e.g., as described with reference to reporting 112 of pose-tracking pipeline 100). As indicated at 192, the reported virtual skeleton may be used as an input by an operating system, one or more applications, or any other suitable receiver.

A problem state (e.g., such as previously described problem state 103 of FIG. 6) may refer to a pre-defined state of a human subject within a scene observed by one or more optical sensors. The observed scene may be captured by the one or more optical sensors as an image. The image may take the form of a depth image or other suitable image that does not necessarily provide depth information. Zero, one, or more problem states may be identified from an individual image (e.g., a time-free image) or from a combination of two or more time-series images. An identification of zero, one, or more problem states may be supplied to the pose-tracking pipeline to aid in the selection of a virtual skeleton output by the pipeline or otherwise select a three-dimensional position of one or more skeletal points in accordance with the identification of the problem state supplied to the pose-tracking pipeline.

Accuracy or reliability of pose recognition may be improved by supplying the identification of problem states to the pose-tracking pipeline because the pose-tracking pipeline may rely on the existence of a number of conditions or assumptions to reliably track a human subject. For example, these conditions or assumptions may include (1) that all body parts of the human subject are fully to mostly visible (e.g., non-occluded to limited occlusion), the absence of which corresponds to the occluded state, (2) all body parts are sufficiently distant from each other (e.g., low to medium proximity), the absence of which corresponds to the proximate state, (3) left-side limbs of the human subject are left of right-side limbs of the human subject, and vice-versa (e.g., no limb crossing), and an upright stance of the human subject has the feet on or near the ground, the torso upright, and no body parts are extended too far overhead (e.g., a neutral stance), the absence of which corresponds to the crossed state, (4) all body parts of the human subject are within the observed scene, the absence of which corresponds to the cropped state, and (5) the human subject is moving within an acceptable velocity range, the absence of which corresponds to the velocity limited state. As will be described in greater detail below, these problem states or the absence thereof may be identified by application of discrete classifications and/or continuous regression measurements.

The occluded state may correspond to a state of the observed depth image where at least a portion of the human subject is blocked from view within the scene by an object. The object may include another portion of the human subject (e.g., a limb or a body portion) or by another object (including other human subjects) within the environment. For example, a human subject may assume a sideways pose in which an arm and a leg may be hidden from view by the body and other leg of the human subject. Some body parts may also meaningfully self-occlude. For example, a human subject may assume a seated position in which the upper legs of the human subject are parallel to the line of sight of the optical sensor. Visible surface area estimates (e.g., in square millimeters (mm^2) or other suitable measurement) obtained from an observed image can provide a measure of occlusion for a body part where a value of 0.0, as a non-limiting example, corresponds to total occlusion of the body part. A ratio of the visible surface area estimate to an expected surface area may be used to provide a useful unit-less measure of occlusion. However, surface area also depends on orientation of the body part within the observed image. Accordingly, the maximum surface area for the body party may be used to quantify self-occlusion of the body part. As an alternative to these continuous measures of occlusion, occlusion may be quantified as a discrete classification of either (1) none/minimal, (2) partial, or (3) total occlusion.

The cropped state may correspond to a state of the observed depth image where at least a portion of the human subject resides outside a boundary of the scene. Cropping may also correspond to a state of the observed depth image where the human subject exceeds a near or far plane relative to the optical sensor. Placement of the optical sensor and play space limits within which the human subject can move may result in inapplicability of the cropped state to one or more of the 6 boundaries of the scene, such as the lower boundary when the floor is fully in frustum or the far plane forming the rear boundary when the rear room wall is nearer to the optical sensor. As with occlusion, visible surface area estimates may also provide a measure of cropping where a value of 0.0, as a non-limiting example, indicates a totally cropped body part. A discrete classification scheme having two or more cases or states may be used in addition to or as an alternative to continuous measurements. For example, a continuous measure of cropping may be quantified as a discrete classification of (1) none, (2) partial, or (3) total cropping. As another example, the cropping may be quantified as a discrete classification of (1) cropped or (2) un-cropped. Any discrete classification scheme of more than two cases or states may be expressed as a series of pairs. For example, a typical six-sided die has the discrete values 1 to 6, which may be represented as 6 cases or 6 pairs of cases (e.g. 1, not 1). Accordingly, the example discrete classifications described herein should be considered non-limiting.

The proximate state may correspond to a state of the observed depth image where at least a portion of the human subject resides within a threshold depth proximity to an object within the scene. The object may include another part of the human subject such as a limb or body core, or may include an object within the environment. The proximity state may occur, for example, when another part of the body or the environment is not between the body part and optical sensor, but is very close to or in contact with the body part. Distance estimates (e.g., in millimeters or other suitable measurement) can provide a measure of proximity where a value of 0.0, as a non-limiting example, indicates that the body part and the object are touching. Depth sensors have distance dependent noise floors for measurement resolution and precision. As an alternative to or in addition to a continuous measure of proximity, proximity may be quantified as a discrete classification of (1) outside, (2) near, or (3) within the noise floor of the depth sensor. As another example, the cropping may quantified as a discrete classification of (1) outside the noise floor or (2) within the noise floor. However, other suitable numbers and/or types of discrete classifications may be used. In some examples, discrete classifications may be easier to specify, apply, and or detect than continuous measurements, discrete classifications may be more computationally efficient than continuous measurements, and/or discrete classifications may be more useful than continuous measurements, or may provide additional value when used in combination with continuous measurements.

The crossed state may correspond to a state of the observed depth image where a body part of the human subject crosses a virtual boundary dividing the virtual skeleton into at least two regions from a native region to a non-native region. In some embodiments, a human subject may be assigned a number of virtual boundaries. These virtual boundaries may include, for example, a sagittal plane, a transverse plane, and a coronal plane. The anatomical planes may help describe the location of body parts in relation to each other. For a person facing the optical sensor in a relaxed stance, the sagittal plane divides the right and left sides of the human subject, the coronal plane divides the front and back of the human subject, and the transverse plane divides an upper (superior) portion of the human subject from a lower (inferior) portion of the human subject. Crossing occurs, for example, whenever a leg or an arm, or other body part crosses one of these planes. For the purpose of transverse crosses, an upper transverse plane at the shoulders of the human subject may apply to arms and a mid-transverse plane at the waist of the human subject may apply to legs. Distance estimates (e.g., in millimeters or other suitable measurement) can provide a measure of crossing where a value of 0.0, as a non-limiting example, indicates plane intersection and a negative value, as another non-limiting example, may indicate plane crossing by a body part.

The velocity limited state may correspond to a state of the observed depth image where the human subject has a velocity in the scene that exceeds an upper velocity threshold and/or a lower velocity threshold. Entropy increases with both absence of motion of the human subject and motion of the human subject exceeding optical sensor limits. Velocity estimates (e.g., in millimeters per millisecond or other suitable measurement) are limited by the time-series step between observed images. Other limitations of velocity may include distance dependent depth noise floors for no velocity to slow velocity of the human subject, and exposure time for very fast velocity of the human subject.

Figure 9:
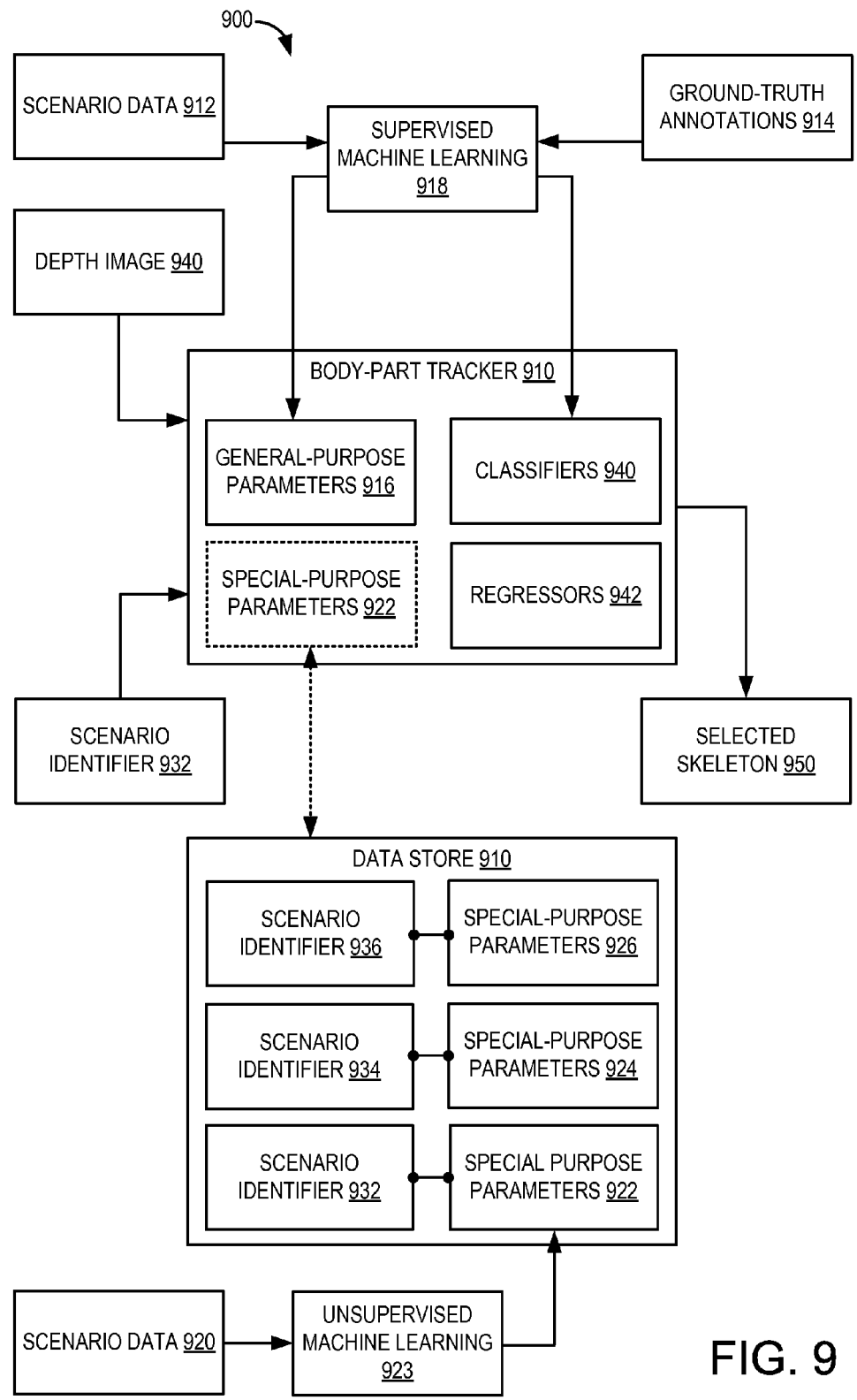
FIG. 9 schematically shows an example flow of data through a body-part tracker in which training, retraining, and tracking of a human subject is performed in accordance with an embodiment of the present disclosure.

FIG. 9 schematically shows an example data flow 900 through a body-part tracker 910 in which training, retraining, and tracking of a human subject is performed. A body-part tracker, such as body-part tracker 910 may be expressed as a collection of functions that define one or more classifiers 940 supporting one or more classifier functions, one or more regressors 942 supporting one or more regression functions, and associated parameters that are used by the one or more classifiers to determine a respective classifier result and the one or more regressors to determine a respective regression result.

Classifier functions may be used in the context of categorical analysis, while regression functions may be used in the context of numeric analysis. An example of a classifier function is predicting body part membership of a depth pixel. An example of a regression function is predicting the position of a skeletal joint in two-dimensional or three-dimensional space. The term "trained function" may be used to encompass both classifier functions and regression functions, as well as functions which take action based upon one or more classifier and/or regression decisions.

Parameters may modify or otherwise influence function inputs and outputs, function weighting, function branching, and/or function selection. Parameters defining the relative weighting of these functions, including selection of which functions are applicable to a particular scenario, and other parameter values used by these functions govern the effectiveness of a body-part tracker. Accordingly, the parameters that are used by the body-part tracker may influence the selection of body models representing the human subject. Machine learning techniques described herein may be employed to efficiently and effectively optimize these parameters.

During an initial training phase, scenario data 912 may be used in combination with ground-truth annotations 914 to identify one or more general-purpose parameters 916 using supervised machine learning 918. As one example, the one or more general-purpose parameters may be identified by selecting the one or more general-purpose parameters from a set of available general-purpose parameters. Selection may be based on scenario data 912 and/or ground-truth annotations 914. The set of available general-purpose parameters may include any suitable number of general-purpose parameters. Additionally, the one or more general-purpose parameters may be identified by specifying a value to be associated with each of the one or more general-purpose parameters selected from the set of available general-purpose parameters. Values associated with the general purpose parameters may be based on scenario data 912 and/or ground-truth annotations 914. Scenario data 912 may include a set of different instances of scenario data, whereby each instance represents a human training-subject performing one or more actions. Each instance of scenario data may include one or more depth images that represent a depth-camera recording of the human training-subject performing an action.

A body-part tracker 910 that has been initially trained using supervised machine learning 918 across a number of different scenarios involving a number of different actions performed by a number of different human training-subjects may be referred to as a general-purpose body-part tracker. A general-purpose body-part tracker may be initially trained to provide suitable tracking of human subjects having a variety of different body types, body orientations and/or positions, for use with a variety of different scenarios presented by a variety of different application programs. As one example, body-part tracker 910 may be trained using scenario data for a wide variety of actions, such as running, jumping, crouching, twisting, gesturing, manipulating a physical object, etc. Body-part tracker 910 may use the one or more general-purpose parameters 916 to track a human subject that performs a variety of different actions presented by a number of different scenarios.

Machine learning may refer to the identification, by a machine, of a desired dependence using a limited number of observations. Supervised machine learning typically includes a machine learner, a generator drawing input observations from a limited training set, and a supervisor specifying the desired dependence output for each observation. For highly complex machine learning problems, characterized, for example, by a high dimensionality input and output, and an expansive operational envelope in which the machine learner is expected to succeed, the problem of producing a statistically representative training set and/or specifying associated dependences (e.g., ground-truth) becomes quite expensive, often requiring highly specialized expertise, substantial process, and many man and machine years of effort.

The above operational envelope refers to the set of operating dimensions that the body-part tracker considers or may consider to track a particular subject. For example, a general-purpose body-part tracker may track human subjects of varying sizes within a variety of different physical spaces. Example operating dimensions for human subjects may include body shape, body size, hair type (e.g., including facial hair or lack thereof, long/poofy hair or lack thereof, etc.), clothing type (e.g., including oversize jackets, dresses, or fitted clothing).

A particular application program, however, may be concerned with one or more particular scenarios rather than the entire domain of potential scenarios, or the particular application program may be concerned with a new or different scenario that was not observed during initial training of the general-purpose body-part tracker. These particular scenarios may be limited to a lesser number of actions than the entire domain of actions used by a number of other application programs. Such actions may include specific poses, motions, or gestures that are applicable to the particular scenario.

During a subsequent retraining phase following an initial training phase, scenario data 920 may be used without ground-truth annotations to identify one or more special-purpose parameters 922 using unsupervised machine learning 923. As one example, the one or more special-purpose parameters may be identified by selecting the one or more general-purpose parameters from a set of available special-purpose parameters. Selection may be based on scenario data without reliance on ground-truth annotations. The set of available special-purpose parameters may include any suitable number of special-purpose parameters. Additionally, the one or more special-purpose parameters may be identified by specifying a value to be associated with each of the one or more special-purpose parameters selected from the set of available special-purpose parameters. Values associated with the special-purpose parameters may be based on scenario data without reliance on ground truth annotations. Unsupervised machine learning 923 is in contrast to supervised machine learning 918 in which ground-truth annotations were used to identify the one or more general-purpose parameters 916. In some examples, ground-truth annotations may be initially defined or otherwise specified, at least in part, by a human supervisor.

Scenario data 920 may include a set of different instances of scenario data for a particular scenario. As one example, each instance of scenario data 920 may include one or more depth images that represent a depth-camera recording of a human training-subject performing an action specific to the particular scenario. Scenario data 920 used for retraining for a particular scenario is in contrast to scenario data 912 used for general-purpose training for a diverse range of scenarios. In some examples, the action specific to the particular scenario of scenario data 920 may be different than the actions of scenario data 912. As previously described, each scenario may have one or more actions. While an example scenario may be described as having an example action, it will be understood that the example scenario may include one or more additional actions beyond the example action. In such cases, each action may be associated with an action identifier that enables two or more actions to be distinguished from each other, even within a common scenario.

Unsupervised retraining may be supplemented with cost effective supervision by a human supervisor and/or machine supervisor. Consider a golf swing and human skeletal tracker for example. A human developer in the role of a human supervisor may visualize and inspect together the skeleton output from the tracker given a recording before and after the retraining. The human developer can then indicate a preference for one of the recordings by selecting that recording. The tracker may integrate these preferences or selections into subsequent retraining sessions to improve desired output. This limited supervision may be less expensive and faster than typical supervision, which in this case may, for example, involve a supervisor at least specifying joint locations at an acceptable frame interval.

Another form of cost effective supervision may utilize a set of training recordings with ground-truth. While perhaps cost prohibitive for the typical application developer, the tracker developer would typically have such a set of training recordings with ground-truth. The tracker may use parameters derived from retraining to inspect this training set and select related recordings or frames from the supervised training set. The tracker may then output skeleton models before and after retraining, which may be scored against ground-truth. The tracker may use these scores to further improve desired output.

The one or more special-purpose parameters 922 identified from scenario data 920 for the particular scenario may be associated with a scenario identifier 932 at a data store 940. Data store 940 may form an element of an operating system, the body-part tracker, an application program, or a remotely accessible database. Other sets of special-purpose parameters 924, 926 may be associated with respective scenario identifiers 934, 936. Special-purpose parameters 924, 926 may have been identified from other scenario data during other retraining sessions in which each instance represents a human training-subject performing an action specific to those scenarios. For example, special-purpose parameters 922 may be applicable to a human subject throwing a punch, special-purpose parameters 924 may be applicable to a human subject swinging a golf club, and special-purpose parameters 926 may be applicable to a human subject performing a hand gesture.

Body-part tracker 910 may selectively use the one or more general-purpose parameters 916 and/or one or more special purpose parameters to track a human subject. For example, special-purpose parameters may be selectively used by body-part tracker 910 to augment or replace the one or more general-purpose parameters 916 if the general-purpose body-part tracker is used to track a human subject performing an action specific to a particular scenario. The one or more special-purpose parameters may influence selection of a body model identified by the body-part tracker, or at least a three-dimensional position of one or more points defining the body model of the human subject.

During a subsequent session, for example, a currently-observed human subject may be captured in one or more depth images 940. Depth images 940 may be received by body-part tracker 910. In at least some examples, depth images 940 may be received with an indication of one or more applicable general-purpose and/or special-purpose parameters.

As one example, this indication may take the form of a scenario identifier, such as scenario identifier 932. Scenario identifier may be received, for example, from a currently-active application program via an application programming interface. Scenario identifier 932 may be used to identify the one or more special-purpose parameters 922 that are associated with scenario identifier 932 at data store 920 so that the special-purpose parameters may be retrieved for use. An indication of one or more applicable general-purpose parameters may include a general-purpose scenario identifier (e.g., scenario identifier=1, in contrast to scenario identifier=2 for a special-purpose parameter) and/or a null value where a special-purpose scenario identifier would be otherwise expected to be present (e.g., special-purpose scenario identifier=null).

As another example, an indication of one or more applicable general-purpose and/or special-purpose parameters may include the one or more general-purpose and/or special purpose parameters to be used by the body-part tracker. For example, one or more special purpose parameters that are received by body-part tracker 910 or otherwise indicated as being applicable may replace one or more general-purpose parameters.

Body-part tracker 910 may process depth image 940 using the one or more special-purpose parameters 922 associated with scenario identifier 932 to enhance body-part tracking of the body-part tracker if the body-part tracker tracks the currently-observed human subject performing the action specific to the particular scenario. The body-part tracker identifies a body model representative of the human subject (e.g., a selected skeleton 950) that is based, at least in part, on the parameters used by the body-part tracker in combination with classifiers 940 and/or regressors 942.

Alternatively or additionally, body-part tracker 910 may output an indication (e.g., scenario identifier 932) that input data (e.g., depth images 940) is applicable to a particular scenario. The indication may be used by an application program in any suitable way, such as to influence gameplay or application program response.

It will be understood that one or more instances of a body-part tracker may be used to provide training, retraining, and/or end-use tracking of a human subject. For example, supervised training used to identify general-purpose parameters may be performed by a first entity (e.g., a business responsible for development of the body-part tracker platform) using one or more instances of the body-part tracker. Unsupervised retraining used to identify special-purpose parameters (e.g., as described with reference to FIG. 10) may be performed by a second entity (e.g., an application program developer) using one or more other instances of the body-part tracker. Application of the general-purpose and/or special purpose parameters to observed depth images for the purpose of tracking a currently-observed human subject (e.g., as described with reference to FIG. 11) may be performed by yet another instance of the body-part tracker that is owned or operated by a third entity (e.g., a consumer or end-user). Accordingly, training, retraining, and/or end-use tracking of a human subject may not be performed by the same instance of the body-part tracker.

An unsupervised retraining mode of operation may be implemented either within the body-part tracker runtime or as a separate retraining shell component interfacing with the body-part tracker runtime. Accordingly, the term body-part tracker, in the context of retraining, is to be understood as including either the body-part tracker runtime supporting retraining, or the combination of a retraining shell and the body-part tracker runtime. Individual instances of the body-part tracker may be fully developed and ready for operation before being deployed to the second and third entities described above. In such implementations, a fully functional body-part tracker may be developed and deployed preconfigured for supervised and unsupervised machine learning, as well as runtime body-part tracking. In other implementations, the entity responsible for retraining may combine the retraining shell and the body-part tracker runtime to achieve retraining.

Figure 10:
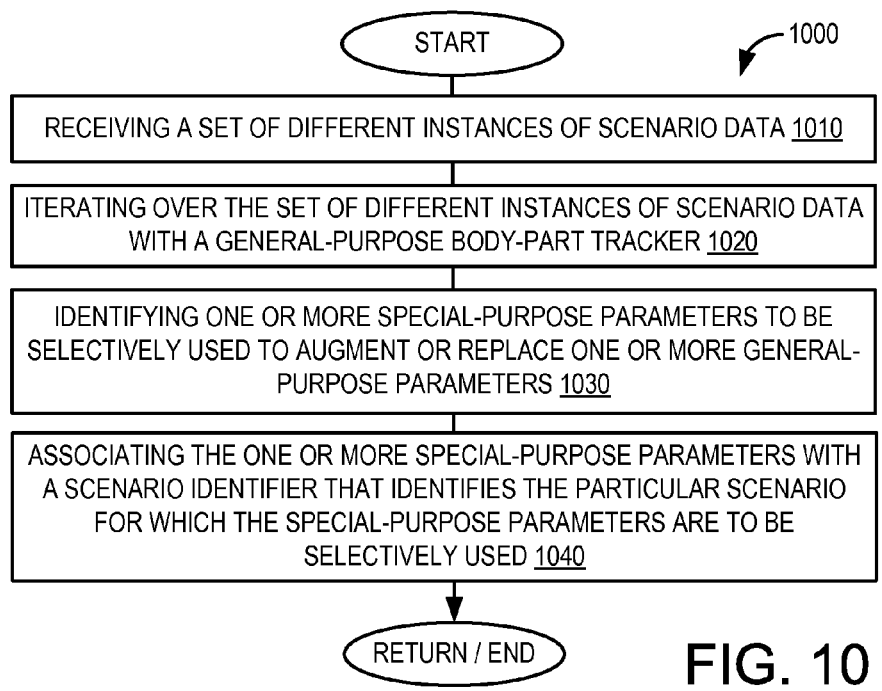
FIG. 10 is a flow diagram depicting an example method of retraining a general-purpose body-part tracker in accordance with an embodiment of the present disclosure.

FIG. 10 is a flow diagram depicting an example method 1000 of retraining a general-purpose body-part tracker.

At 1010, the method includes receiving a set of different instances of scenario data. Each instance of the scenario data may represent a human training-subject performing one or more actions specific to a particular scenario. Scenario data may include an individual depth image, a time-series of depth images, or a temporally unassociated set of multiple depth images for each instance in which an action is performed. The scenario data may include previously recorded sensor streams and/or real-time sensor streams.

At 1020, the method includes iterating over the set of different instances of scenario data with the general-purpose body-part tracker. Iterating over different instances of scenario data may be used by the general-purpose body-part tracker to identify special purpose parameters and/or to output, based on convergence and/or divergence criteria, an indication of whether sufficient training has been achieved for a given set of scenario data, or whether additional scenario data is needed to obtain compliance with convergence and/or divergence criteria. Accordingly, an application program developer or other suitable entity engaged in retraining of the body-part tracker may be notified by the body-part tracker that further recordings are necessary to obtain a desired level of convergence.

If the tracker also knows its associated error probabilities before and after its corresponding response, this information can be used to verify the associated state detection and therefore the adjusted state probability. Output error detectors may not only serve as further confirmation, but may also be used to determine improved response (i.e. reduced error). This process can also be carried out one or more times, so that for example, the tracker can reweigh which response to choose when multiple responses are available per problem state.

As one example, a body-part tracker may use problem state detectors to identify the existence of problem states based on problem state probabilities. Each iteration over the scenario data by the body-part tracker produces problem state sample probabilities. The problem state sample probabilities may be used instead of or blended with the population problem state probabilities for the next iteration.

As another example, if a problem state response by a body-part tracker depends on error probabilities, then the body-part tracker may iterate during retraining. Each pass over an instance of the scenario data may be used to produce response error probabilities. The response error probabilities produced from scenario data may be used instead of or blended with a population of response error probabilities for the next iteration.

At 1030, the method includes identifying one or more special-purpose parameters to be selectively used to augment or replace the one or more general-purpose parameters if the general-purpose body-part tracker is used to track a human subject performing the action specific to the particular scenario. During a retraining phase, the body-part tracker may use state detection and response to identify the one or more special-purpose parameters at 1030 based, at least in part, on the iterations performed at 1020.

Individual general-purpose and individual special-purpose parameters may be defined by an individual parameter type and an individual parameter value. Non-limiting examples of an individual parameter type include problem state probabilities, response error probabilities, and assigned weightings. Individual parameter values may include a magnitude and/or a direction indicating a quantity, amount, or other suitable value. Non-limiting examples of an individual parameter value include a numeric value (e.g., 30 or −3.67) or a text value (e.g., true or false, yes or no, etc.). Individual parameter values may be discrete or continuous across a domain of acceptable values for each individual parameter type. Furthermore, each separate individual parameter may serve as one of a plurality of parameters collectively constituting a multi-dimensional vector.

As one example, for a body-part tracker that includes output error detectors and includes response error population probabilities in its parameters, the output error detectors may be used during retraining to count output error frequency for its responses and thus establish response error probabilities for the particular scenario.

The body-part tracker may include one or more output error detectors that enable the body-part tracker to assess its output or result. Non-limiting examples of errors identified by a body-part tracker include: kinematically or physiologically impossible or improbable poses, bone lengths outside the temporally accumulated norm for the human subject, weak and/or highly distributed body part classification probabilities, etc. In the context of weighted response selection, the assigned weighting may include output error detector results, including responses and lack of responses from the error detectors.

As another example, a body-part tracker that includes problem state population probabilities in its parameters may use its problem state detectors during retraining to count problem state frequency in the application scenario recordings sample and thus establish problem state probabilities for the application scenario. During retraining, the body-part tracker may produce one or more parameter streams based on the scenario data to alter its problem state detection and/or response selection for the scenario. These parameters may be stored and retrieved in a variety of ways, including (1) as a parameter file that may be saved and loaded separate from the body-part tracker runtime, or (2) may be written directly into the body-part tracker runtime code.

For example, a general-purpose body-part tracker may have previously learned the population probabilities of problem states for a particular operational envelope during an initial training phase. The population probabilities may be derived by the general-purpose body-part tracker from a statistically representative set of training data. A problem state may be defined as corresponding to a state that results in higher probabilities of error than the population norm. For problem states, the body-part tracker may also have knowledge of the associated error probabilities both before and after a corresponding response. The body-part tracker may include input state detectors and associated output error detectors that can be applied to evaluate intermediate output before and after a response.

During retraining, the general-purpose body-part tracker may analyze the scenario data to determine a detection frequency for each problem state. The detection frequency for each problem state may take the form of respective special-purpose parameters or may influence one or more special-purpose parameters that in turn enable the general-purpose body-part tracker to adjust or replace its population probabilities during a subsequent runtime. These adjusted or replaced population probabilities may alter the body-part tracker's belief of and/or reliance on its problem state detectors. For example, certain problem state detector responses may be ignored by the body-part tracker, or such detectors may not be used by the body-part tracker.

If the body-part tracker has knowledge of associated error probabilities before and after a response, this information may be used by the body-part tracker to verify the associated state detection and therefore the adjusted state probability.

Output error detectors may serve as further confirmation and may be used to determine improved tracker response (e.g., reduced tracking error). This process may also be iteratively carried out one or more times, so that the tracker can reweigh which response to choose when multiple responses are available per problem state.

It should be understood that while problem state probabilities and response error probabilities are example parameters that may be retrained, any parameter with population probabilities may be identified from unsupervised retraining provided that the body-part tracker is able to reliably estimate these parameters for a given set of training data.

At 1040, the method includes associating the one or more special-purpose parameters with a scenario identifier. As one example, a scenario identifier may be associated with the one or more special-purpose parameters at a data store. The scenario identifier may be used to identify the particular scenario for which the special-purpose parameters are to be selectively used by the general-purpose body-part tracker to track a human subject.

A scenario identifier may take the form of a numerical identifier, a text string, a globally unique identifier (GUID), a file path identifying a destination of the one or more special-purpose parameters at a data store, or other suitable identifier. As previously discussed, a scenario identifier may not be used to identify special-purpose parameters in some examples, such as where the special-purpose parameters are directly communicated to the body-part tracker.

As previously discussed, retraining of the general-purpose body-part tracker to identify the one or more special-purpose parameters may be unsupervised. For example, the set of different instances of scenario data may be received at 1010 without supervised ground-truth annotations. However, unsupervised retraining of the body-part tracker may be supplemented by limited and/or cost effective supervision in some implementations.

As one example, the limited supervision may include an application program developer indicating a preference between two or more outputs produced by the body-part tracker per recording. The recording may include one, two, or more depth images. A video recording, for example, may take the form of a time-series of multiple observed depth images. As one example, a recording of a golf swing may enable an application program developer to visualize and inspect the skeleton output from the tracker given a recording before and after the retraining. The developer may indicate a preference for one of the general-purpose result, an early retraining result, or a later retraining result.

For time-series depth images, the application program developer may be permitted to access individual frames in time-series order, at random, or at increased or reduced playback rates. Two or more instances of the same recording may be presented to the application program developer overlaid with one or more tracker outputs so that the application program developer can indicate or otherwise select a preferred tracker output. Response weighting or other suitable parameter set by the retrained body-part tracker may be based on the preferred tracker output as indicated by the application developer. For three-dimensional streams, the application program developer may control the camera perspective to inspect the input and output streams from multiple perspectives.

The body-part tracker may integrate these indicated preferences into subsequent retraining sessions to improve tracker output. Supplementing unsupervised retraining with limited supervision may be performed iteratively over a number of recordings, for example. This limited supervision may be less expensive and less time consuming than typical forms of supervision, such as those involving the application program developer providing ground-truth annotations. For example, ground-truth annotations may involve a human manually specifying individual joint locations of the human subject at an acceptable frame interval.

Unsupervised retraining of the body-part tracker may also be supplemented by the body-part tracker drawing matches or making comparisons with an available supervised training set. As one example, the body-part tracker may use matches to improve tracker output by comparing output scores against available ground-truth annotations. While cost prohibitive for some application program developers, the initial body-part tracker developer will typically have access to a set of ground-truth annotations used during initial supervised training. The body-part tracker may be used to output virtual skeletons of a human subject before and after retraining, which may be scored against such ground-truth annotations. The body-part tracker may use these scores to set special-purpose parameters used to improve or enhance tracker output. The body-part tracker may perform this matching process iteratively over a number of instances of scenario data.

Figure 11:
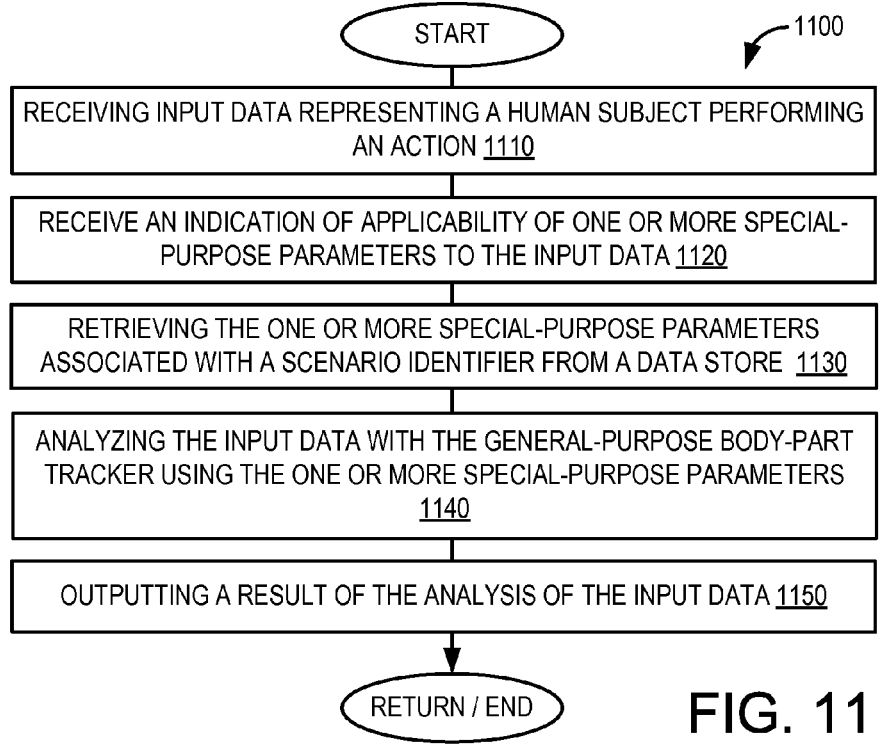
FIG. 11 is another flow diagram depicting an example method of tracking a human subject in accordance with an embodiment of the present disclosure.

FIG. 11 is a flow diagram depicting an example method 1100 for tracking a human subject. Special-purpose parameters identified by application of method 1000 of FIG. 10 may be used in method 1100 of FIG. 11 to track a human subject. As one example, the human subject may be a currently-observed human subject that is interacting with a currently-active application program during runtime (e.g., human subject 18 of FIGS. 1A and 1B).

At 1110, the method includes receiving input data representing a human subject performing an action. The input data may take the form of one or more depth images representing a depth-camera recording of the currently-observed human subject. The input data may take the form of a time-series of depth images in the case of a video depth-camera recording.

At 1120, the method includes receiving an indication of applicability of one or more special-purpose parameters to the input data. As one example, the indication of applicability may be received in the form of a scenario identifier. The indication may, for example, include a signal that is representative of the scenario identifier. As another example, the indication of applicability may be received in the form of the one or more special-purpose parameters applicable to the particular scenario without reference to a scenario identifier. Using the example of FIGS. 1A and 1B, the boxing game may provide an indication of a special-purpose parameter corresponding to a punching action, because the game state of the boxing game suggests that human subject 18 is likely or expected to throw a punch, or a punch action is available to the human subject within the context of the boxing game.

At 1130, the method may include retrieving the one or more special-purpose parameters associated with the scenario identifier from a data store. The method at 1130 may be performed responsive to receiving the scenario identifier at 1120. The special-purpose parameter may be received directly in examples where a scenario identifier is not used to identify applicable special-purpose parameters.

At 1140, the method includes analyzing the input data with the general-purpose body-part tracker using the one or more special-purpose parameters indicated as being applicable to the input data to identify a body model. The one or more special-purpose parameters may be used by the body-part tracker in combination with or in place of the one or more general-purpose parameters. For example, special-purpose parameters may be used by the body-part tracker to alter or otherwise influence one or more of (1) detection probabilities; (2) detection and/or response confidence; (3) detection and/or response weighting (including on/off weighting or function selection) that are used by the pose-tracking pipeline to select and report a virtual skeleton or other suitable body model. As one example, the one or more special-purpose parameters may influence one or more of: (1) a weighting of one or more classifier functions used to identify the body model of the human subject, (2) a selection and/or branching of one or more classifier functions used to identify the body model of the human subject, (3) a weighting of one or more regression functions used to identify a position of at least a portion of the body model of the human subject in two-dimensional or three-dimensional space, (4) a selection and/or branching of one or more regression functions used to a position of at least a portion of the body model of the human subject in two-dimensional or three-dimensional space.

Furthermore, a tracker with output error detectors may analyze input with both general purpose and special purpose parameters. Output error detector results may be compared and either the general purpose or special purpose result may be chosen based on this comparison.

At 1150, the method includes outputting or otherwise reporting a result of the analysis of the input data. As one example, the result may include a selected virtual skeleton or other suitable body model that is representative of the human subject.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of retraining a general-purpose body-part tracker, the method comprising:
receiving a set of different instances of scenario data, each instance of scenario data representing a human training-subject performing an action specific to a particular scenario;
iterating over the set of different instances of scenario data with the general-purpose body-part tracker, the general-purpose body-part tracker previously trained using supervised machine learning to identify one or more general-purpose parameters to be used by the general-purpose body-part tracker to track a human subject; and
identifying one or more special-purpose parameters to be selectively used to augment or replace the one or more general-purpose parameters if the general-purpose body-part tracker is used to track a human subject performing the action specific to the particular scenario; and
associating the one or more special-purpose parameters with a scenario identifier that identifies the particular scenario for which the special-purpose parameters are to be selectively used by the general-purpose body-part tracker to track a human subject.

2. The method of claim 1, further comprising:
receiving input data representing a human subject performing an action;
receiving the scenario identifier indicated as being applicable to the input data; and
analyzing the input data with the general-purpose body-part tracker using the one or more special-purpose parameters associated with the scenario identifier indicated as being applicable to the input data to identify a body model representing the human subject.

3. The method of claim 2, wherein the one or more special-purpose parameters influence one or more of:
a weighting of one or more classifier functions used to identify the body model of the human subject;
a selection and/or branching of one or more classifier functions used to identify the body model of the human subject;
a weighting of one or more regression functions used to identify a position of at least a portion of the body model of the human subject in two-dimensional or three-dimensional space; and/or
a selection and/or branching of one or more regression functions used to identify a position of at least a portion of the body model of the human subject in two-dimensional or three-dimensional space.

4. The method of claim 2, wherein the one or more special-purpose parameters influence selection of a three-dimensional position of one or more points defining the body model of the human subject.

5. The method of claim 2, further comprising:
retrieving the one or more special-purpose parameters associated with the scenario identifier from a data store responsive to receiving the scenario identifier, the data store forming an element of an application program.

6. The method of claim 1, further comprising:
receiving input data representing a human subject performing an action;
analyzing the input data with the general-purpose body-part tracker using the one or more special-purpose parameters associated with the scenario identifier; and
outputting an indication that the input data is applicable to the particular scenario, the indication including the scenario identifier.

7. The method of claim 1, wherein each instance of scenario data includes one or more depth images representing a depth-camera recording of the human training-subject performing the action.

8. The method of claim 1, wherein retraining to identify the one or more special-purpose parameters is unsupervised, and the set of different instances of scenario data is received without supervised ground-truth annotations.

9. The method of claim 1, further comprising:
outputting an indication that one or more additional instances of scenario data are needed based on convergence and/or divergence of said iterating.

10. The method of claim 1, further comprising:
receiving from a currently-active application program, an indication that a currently-observed human subject is performing the action specific to the particular scenario, the indication representative of the scenario identifier; and
using the one or more special-purpose parameters associated with the scenario identifier to enhance body-part tracking of the general-purpose body-part tracker if the general-purpose body-part tracker tracks the currently-observed human performing the action specific to the particular scenario.

11. A storage device holding instructions, the instructions defining a body-part tracker, the instructions executable by a logic device to:

receive a set of different instances of scenario data, each instance of scenario data representing a human training-subject performing an action specific to a particular scenario;

iterate over the set of different instances of scenario data with the general-purpose body-part tracker, the general-purpose body-part tracker previously trained using supervised machine learning to identify one or more general-purpose parameters to be used by the general-purpose body-part tracker to track a human subject; and identify one or more special-purpose parameters to be selectively used to augment or replace the one or more general-purpose parameters if the general-purpose body-part tracker is used to track a human subject performing the action specific to the particular scenario, the one or more special-purpose parameters based on iteration over the set of different instances of scenario data;

receive input data representing a human subject performing the action specific to the particular scenario; receive an indication of applicability of the one or more special-purpose parameters to the input data; analyze the input data with the general-purpose body-part tracker using the one or more special-purpose parameters indicated as being applicable to the input data to identify a body model of the human subject performing the action.

12. The storage device of claim 11, further executable by the logic device to: output an indication that one or more additional instances of scenario data are needed based on convergence and/or divergence of the iteration.

13. The storage device of claim 11, further executable by the logic device to: associate the one or more special-purpose parameters with a scenario identifier that identifies the particular scenario for which the special-purpose parameters are to be selectively used by the general-purpose body-part tracker to track a human subject; and wherein the indication of applicability includes the scenario identifier.

14. The storage device of claim 11, wherein the one or more special-purpose parameters influence one or more of: a weighting of one or more classifier functions used to identify the body model of the human subject; and/or a selection and/or branching of one or more classifier functions used to identify the body model of the human subject; a weighting of one or more regression functions used to identify a position of at least a portion of the body model of the human subject in two-dimensional or three-dimensional space; and/or a selection and/or branching of one or more regression functions used to identify a position of at least a portion of the body model of the human subject in two-dimensional or three-dimensional space.

15. The storage device of claim 11, wherein the one or more special-purpose parameters influence selection of a three-dimensional position of one or more points defining the body model of the human subject.

16. The storage device of claim 11, wherein each instance of scenario data includes one or more depth images representing a depth-camera recording of the human training-subject performing the action; and wherein the input data representing a human subject includes one or more depth images representing a depth-camera recording of the human subject performing the action.

17. The storage device of claim 11, further executable by the logic device to: receive the set of different instances of scenario data without supervised ground-truth annotations; and identify the one or more special-purpose parameters without supervised ground-truth annotations.

18. A method of tracking a human subject, the method comprising:

receiving input data including a depth image representing a depth-camera recording of a human subject performing an action;

receiving a scenario identifier indicated as being applicable to the input data;

retrieving one or more special-purpose parameters associated with the scenario identifier from a data store; and analyzing the input data with a general-purpose body-part tracker using the one or more special-purpose parameters that augment or replace one or more general-purpose parameters to identify a body model representing the human subject performing the action;

the general-purpose body-part tracker previously trained using unsupervised machine learning to identify the one or more special-purpose parameters after being initially trained using supervised machine learning to identify the one or more general-purpose parameters.

19. The method of claim 18, further comprising, during previous training using unsupervised machine learning:

receiving a set of different instances of scenario data, each instance of scenario data representing a human training-subject performing an action specific to a particular scenario;

identifying, based on the set of different instances of scenario data, one or more special-purpose parameters to be selectively used to augment or replace the one or more general-purpose parameters if the general-purpose body-part tracker is used to track the human subject performing the action specific to the particular scenario; and associating the one or more special-purpose parameters with the scenario identifier that identifies the particular scenario for which the special-purpose parameters are to be selectively used by the general-purpose body-part tracker to track the human subject.

20. The method of claim 18, wherein the one or more special-purpose parameters influence one or more of:

a weighting of one or more classifier functions used to identify the body model of the human subject;

a selection and/or branching of one or more classifier functions used to identify the body model of the human subject;

a weighting of one or more regression functions used to identify a position of at least a portion of the body model of the human subject in two-dimensional or three-dimensional space; and/or a selection and/or branching of one or more regression functions used to identify a position of at least a portion of the body model of the human subject in two-dimensional or three-dimensional space.

\* \* \* \* \*